US011893999B1

(12) United States Patent
Kopuri et al.

(10) Patent No.: US 11,893,999 B1
(45) Date of Patent: Feb. 6, 2024

(54) SPEECH BASED USER RECOGNITION

(71) Applicant: Amazon Technologies, Inc., Seattle, WA (US)

(72) Inventors: Sai Sailesh Kopuri, Seattle, WA (US); John Moore, Acton, MA (US); Sundararajan Srinivasan, Sunnyvale, CA (US); Aparna Khare, San Jose, CA (US); Arindam Mandal, San Jose, CA (US); Spyridon Matsoukas, Hopkinton, MA (US); Rohit Prasad, Lexington, MA (US)

(73) Assignee: Amazon Technologies, Inc., Seattle, WA (US)

(*) Notice: Subject to any disclaimer, the term of this patent is extended or adjusted under 35 U.S.C. 154(b) by 167 days.

(21) Appl. No.: 16/055,755

(22) Filed: Aug. 6, 2018

Related U.S. Application Data

(60) Provisional application No. 62/670,828, filed on May 13, 2018.

(51) Int. Cl.
| | |
|---|---|
| *G10L 17/22* | (2013.01) |
| *G10L 17/04* | (2013.01) |
| *G10L 17/10* | (2013.01) |
| *G06F 40/20* | (2020.01) |

(52) U.S. Cl.
CPC ............. *G10L 17/22* (2013.01); *G06F 40/20* (2020.01); *G10L 17/04* (2013.01); *G10L 17/10* (2013.01)

(58) Field of Classification Search
CPC .. G06F 21/32; G06F 3/167; G06F 2221/2117; G06F 21/00; G06F 21/31; G06Q 20/40145; G10L 15/22; G10L 15/02; G10L 17/02; G10L 17/005; G10L 17/22; G10L 17/26; G10L 15/00; G10L 17/10; G10L 17/16

USPC ........... 704/239, 246, 250, 254, 275; 700/90
See application file for complete search history.

(56) References Cited

U.S. PATENT DOCUMENTS

| | | | |
|---|---|---|---|
| 9,542,948 B2 * | 1/2017 | Roblek .................. | G10L 17/18 |
| 2007/0198257 A1 * | 8/2007 | Zhang ..................... | G10L 17/20 |
| | | | 704/E17.008 |
| 2016/0086609 A1 * | 3/2016 | Yue ........................ | G10L 17/26 |
| | | | 704/250 |
| 2017/0180506 A1 * | 6/2017 | Ren ....................... | H04L 67/306 |

(Continued)

*Primary Examiner* — Richemond Dorvil
*Assistant Examiner* — Rodrigo A Chavez
(74) *Attorney, Agent, or Firm* — Pierce Atwood LLP

(57) ABSTRACT

Techniques for enrolling a user in a system's user recognition functionality without requiring the user speak particular speech are described. The system may determine characteristics unique to a user input. The system may generate an implicit voice profile from user inputs having similar characteristics. After an implicit voice profile is generated, the system may receive a user input having speech characteristics similar to that of the implicit voice profile. The system may ask the user if the user wants the system to associate the implicit voice profile with a particular user identifier. If the user responds affirmatively, the system may request an identifier of a user profile (e.g., a user name). In response to receiving the user's name, the system may identify a user profile associated with the name and associate the implicit voice profile with the user profile, thereby converting the implicit voice profile into an explicit voice profile.

20 Claims, 19 Drawing Sheets

(56) References Cited

U.S. PATENT DOCUMENTS

| | | | |
|---|---|---|---|
| 2017/0236520 A1* | 8/2017 | Borgstrom | G10L 17/12 |
| | | | 704/239 |
| 2017/0256270 A1* | 9/2017 | Singaraju | G10L 25/21 |
| 2018/0082689 A1* | 3/2018 | Khoury | G10L 17/00 |
| 2019/0080690 A1* | 3/2019 | Kikugawa | G10L 15/20 |
| 2019/0156837 A1* | 5/2019 | Park | G10L 17/18 |
| 2019/0251975 A1* | 8/2019 | Choi | H04L 63/083 |
| 2019/0272829 A1* | 9/2019 | Wang | G10L 17/04 |
| 2019/0279618 A1* | 9/2019 | Yadav | G06F 40/30 |
| 2019/0341058 A1* | 11/2019 | Zhang | G06N 3/045 |
| 2019/0371325 A1* | 12/2019 | Nakada | B60K 35/00 |
| 2020/0043471 A1* | 2/2020 | Ma | G10L 15/07 |

* cited by examiner

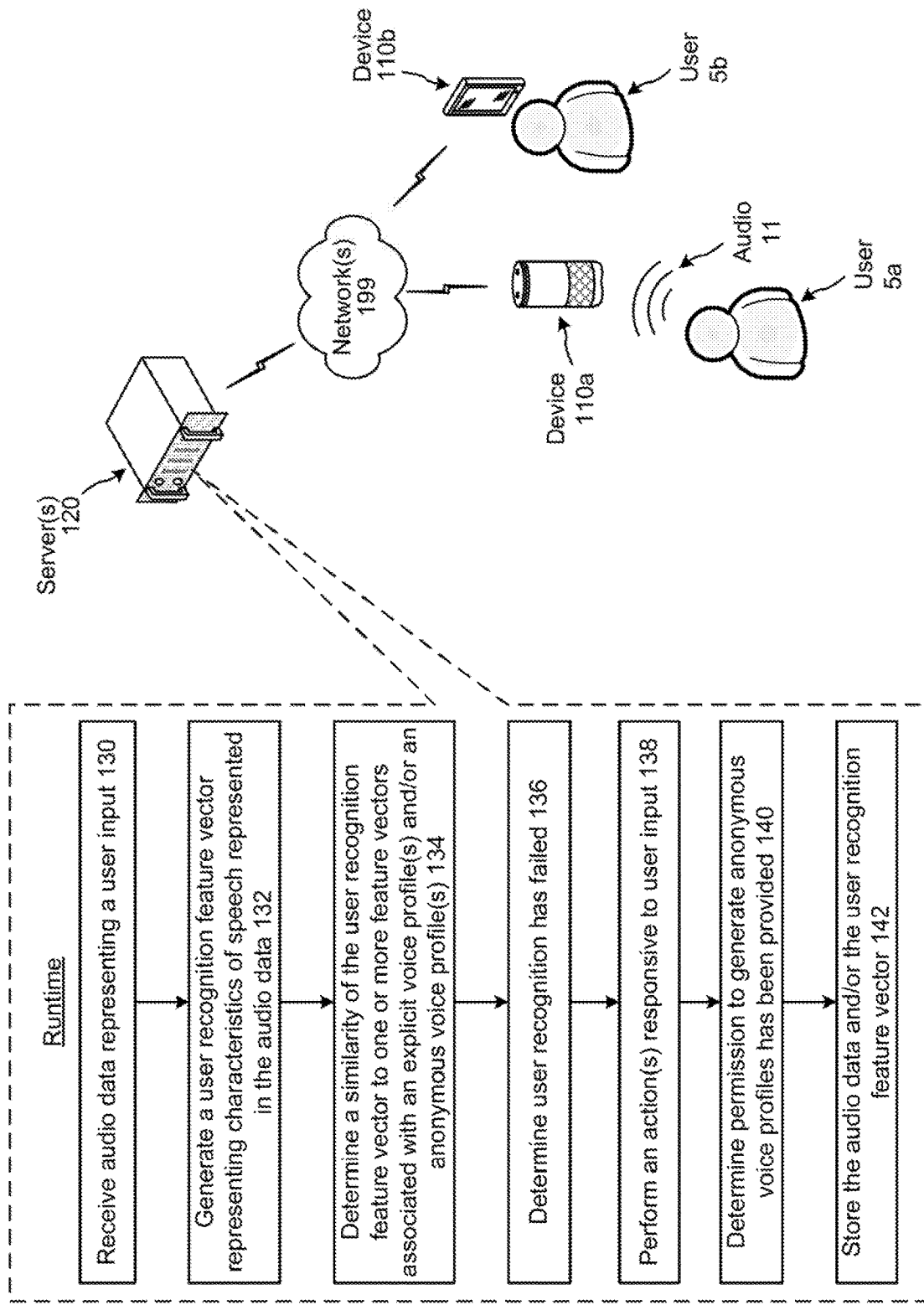

FIG. 4

| Audio Data | Device Identifier / Group Profile Identifier | Intent Indicator | Speech Frames |
|---|---|---|---|
| 12345 | 123 | <Play Music> | 50 |
| 23456 | 234 | <OutputWeather> | 100 |
| 34567 | 123 | <BookRide> | 150 |
| 45678 | 345 | <SetTimer> | 125 |
| 56789 | 456 | <UnlockDoor> | 130 |

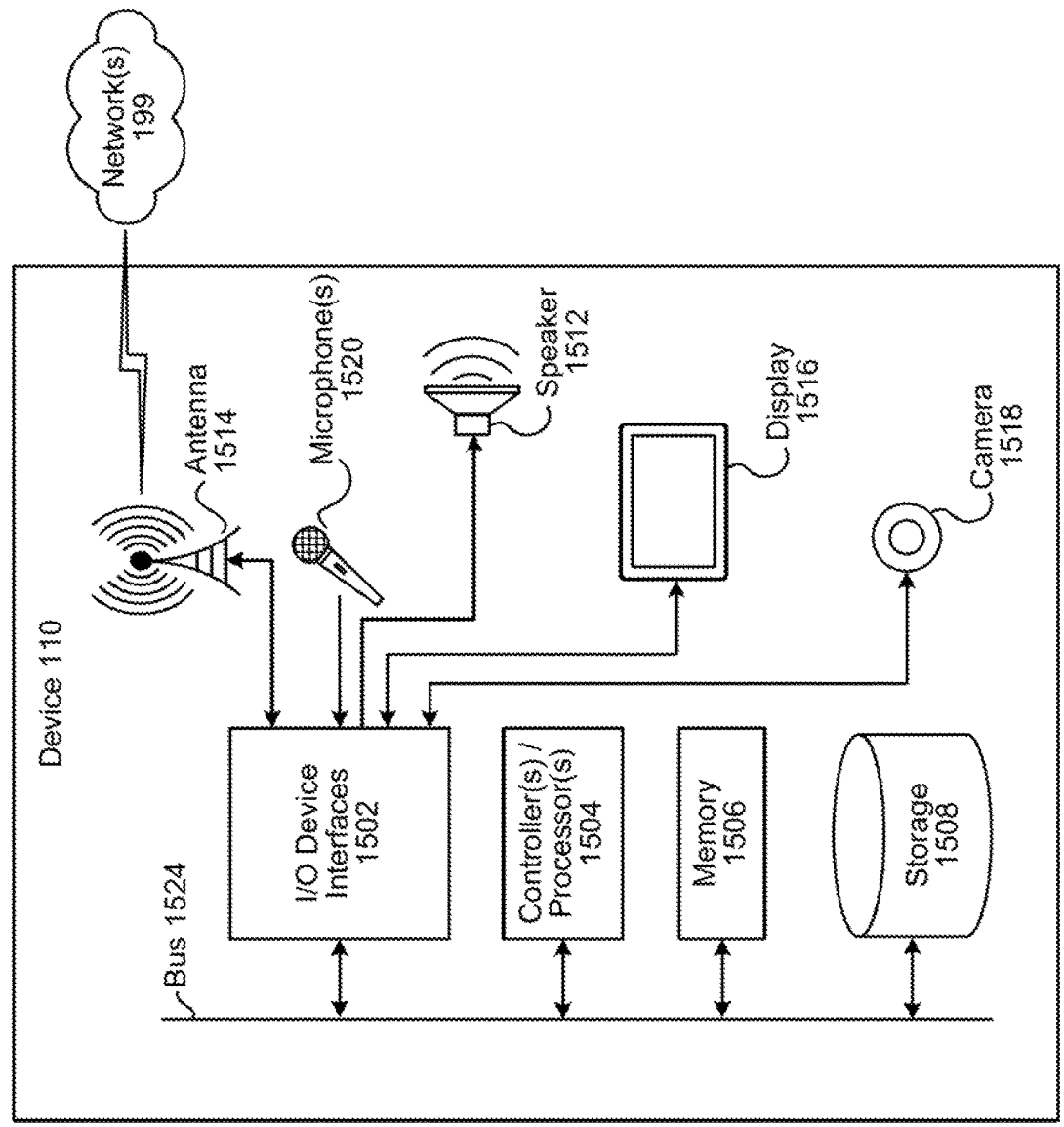

SPEECH BASED USER RECOGNITION

CROSS-REFERENCE TO RELATED APPLICATION DATA

This application claims priority to U.S. Provisional Patent Application Ser. No. 62/670,828, titled "Speech Based User Recognition," filed on May 13, 2018, in the names of Sai Sailesh Kopuri et al. The above patent application is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to generate anonymous voice profiles according to embodiments of the present disclosure.

FIG. 4 is a conceptual diagram of a feature vector storage according to embodiments of the present disclosure.

FIG. 15 is a block diagram conceptually illustrating example components of a device according to embodiments of the present disclosure.

DETAILED DESCRIPTION

Figure 1B:
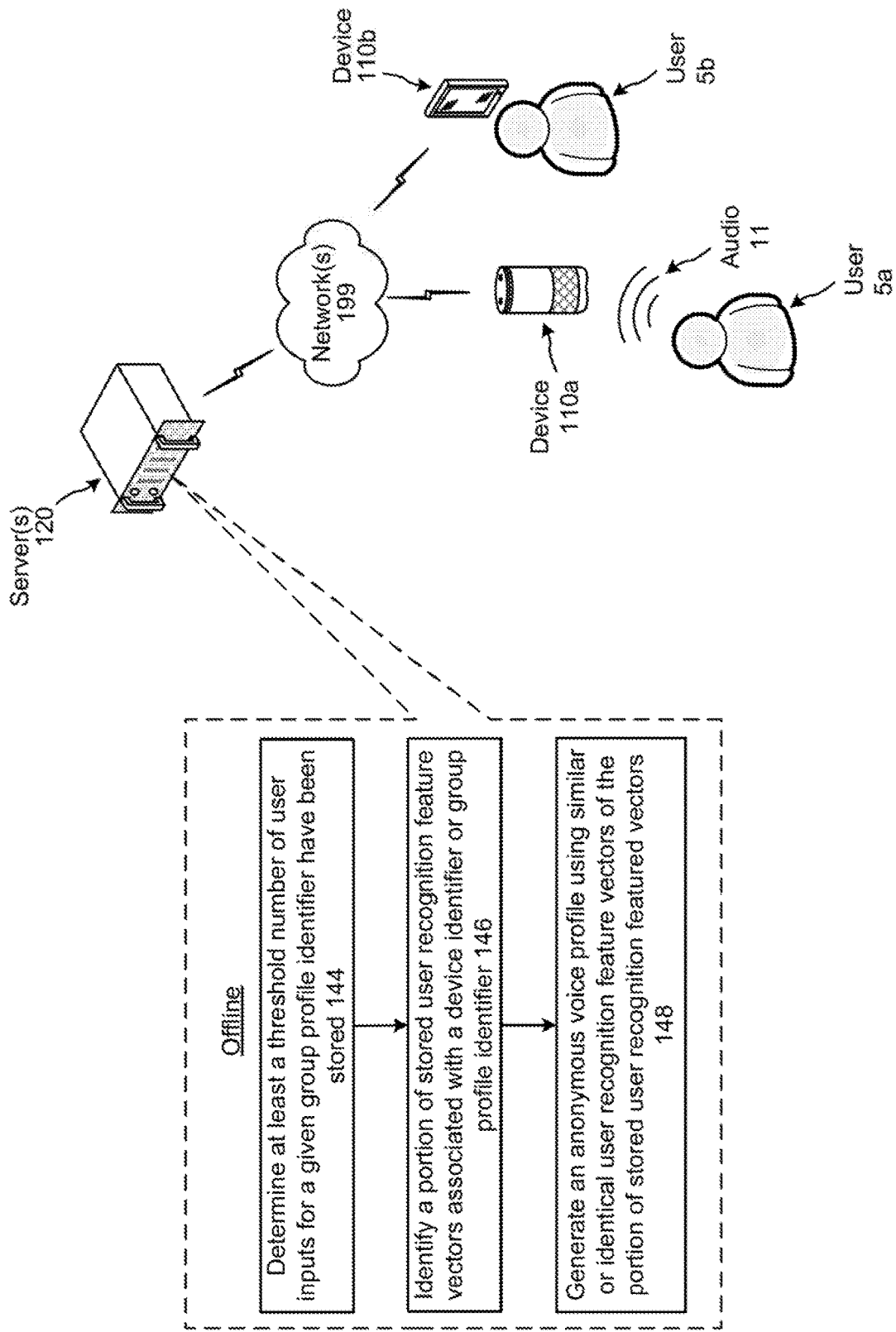

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions in response to user inputs. For example, for the user input of "Alexa, play Adele music," a system may output music sung by an artist named Adele. For further example, for the user input of "Alexa, what is the weather," a system may output synthesized speech representing weather information for a geographic location of the user.

A system may identify a user based on characteristics of speech. For example, when a user input is received as speech, the system may process the speech to determine characteristics of the speech, and compare the characteristics to stored speech characteristics of one or more users of the system.

A system may be configured to identify a user based on the user explicitly enrolling in the system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech from the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A system may use an explicit voice profile to customize an action responsive to a user input. For example, a user input may be: "Alexa, play music." The system may determine speech characteristics from the audio recording of the user input, which correspond to speech characteristics of an explicit voice profile. The system may then determine a user identifier associated with the explicit voice profile, determine a customized music catalog (e.g., an Amazon Music playlist created using a mobile phone's app) associated with the user identifier, and may output music of the customized music catalog. For further example, a user input may be: "Alexa, call John." The system may determine speech characteristics from the audio recording of the user input, which correspond to speech characteristics of an explicit voice profile. The system may then determine a user identifier associated with the explicit voice profile, determine a contact list associated with the user identifier, determine a contact named John, and initiate a call between the device that captured the user input and a device of the recipient "John." Other use cases are also possible.

The present disclosure improves such systems by enabling a system to enroll a user in the system's user recognition functionality without requiring the user speak particular speech for the purposes of enrolling in the user recognition functionality. The system may be configured to obtain user permission prior to performing such automatic enrollment. This ensures the system is only configured to recognize a user's voice if a user so desires, while also removing an extended training period that may traditionally be needed to train the system to recognize a particular user's voice.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

A system may use an anonymous voice profile to customize an action responsive to a user input. Overtime, a user associated with an anonymous voice profile may provide inputs requesting the output of a certain type of music (e.g., classical music, rock music, etc.). The system may maintain a system usage history associated with an anonymous voice profile. At some point, the system may receive a user input corresponding to "Alexa, play music." The system may determine speech characteristics of the user input correspond to speech characteristics of an anonymous voice profile. The system may then determine a system usage history associated with the anonymous voice profile and may determine the system usage history represents various user inputs requesting the output of a particular type of music. Thus, in response to the present user input, the system may output the particular type of music. Other use cases are also possible.

It will be appreciated, however, that an action responsive to a user input using an anonymous voice profile may be less customized that an action customized according to an explicit voice profile. As indicated, an explicit voice profile is associated with a user identifier (which is associated with various user-specific information, such as a name, address, phone number, email address, contact list, music streaming login information, etc.). As such, an explicit voice profile can be used to customize an action to a particular user's music playlist(s), contact list, etc. In contrast, an anonymous voice profile is associated with a user identifier that is not associated with user-specific information, such as a name, address, phone number, email address, contact list, music streaming login information, etc. Nonetheless, the user identifier associated with an anonymous voice profile may be associated with system usage history such that a response to a user input may be customized based on previous user inputs associated with the anonymous voice profile. In addition, in at least some situations, an anonymous voice profile may not be used to initiate calls where the user input simply includes the name of a recipient because an anonymous voice profile may not be associated with any particular user's contact list. Other types of customizations are also possible.

An anonymous voice profile may be converted into an explicit voice profile. At some point after an anonymous voice profile is generated, the system may receive a user input having speech characteristics identical or similar to that of an anonymous voice profile. As part of performing an action responsive to the user input (or after performing the action responsive to the user input), the system may output content (e.g., computer synthesized speech) asking the user if the user wants the system to associate the anonymous voice profile with a particular user identifier. Such output content may correspond to "I have recognized your voice. Do you want me to associate your voice with a user profile." If the user responds affirmatively (e.g., by speaking "yes" or the like), the system may output further content (e.g., further computer synthesized speech) requesting an identifier of a user profile, such as a user name associated with the user profile. For example, such content may corresponding to "what is your name." In response to the user speaking their name, the system may identify a user profile associated with the provided name and associate the anonymous voice profile with a user identifier associated with the user profile, thereby converting the anonymous voice profile into an explicit voice profile. Other situations for converting an anonymous voice profile into an explicit voice profile are described herein.

The teachings of the present disclosure improve existing systems because they decrease system/user interactions involved in enrolling a user in user recognition functionality of a system. Other benefits of the present disclosure will become apparent in view of the following detailed description.

As mentioned above, a system implementing the present disclosure may require user permission to perform the teachings herein. That is, a system may require a user opt in, with informed consent, prior to the system being able to implement the teachings herein with respect to one or more users of a device(s). Such requirement of informed consent ensures, in at least some instances, that a system implementing the present disclosure complies with laws, regulations, standards, and the like governing where the system and/or device(s) is located. Such requirement also assists in maintaining transparency with users of the system regarding how their information is used.

FIGS. 1A and 1B illustrate a system configured to generate anonymous voice profiles. Although the figures and discussion illustrate certain operational steps of the system in a particular order, the steps described may be performed in a different order (as well as certain steps removed or added) without departing from the intent of the disclosure. As illustrated in FIGS. 1A and 1B, the system may include one or more devices (110a/110b) local to one or more users (5a/5b), and one or more servers 120 connected to the devices (110a/110b) across one or more networks 199.

The device 110b (e.g., a smart phone, tablet, or the like) may have a companion application installed thereon. The companion application may enable the device 110b to communicate with the server(s) 120 via the network(s) 199. An example of a companion application is the Amazon Alexa application.

The user 5b may sign in to the companion application using login credentials of an existing user profile stored by the server(s) 120 (or may create a new user profile). Once logged in, the user 5b voluntarily may provide an indication for the system to automatically generate anonymous voice profiles using user spoken inputs captured by one or more devices 110a associated with the user 5b's profile (or a group profile, such as a household profile including the user 5b's profile). For added security, after receiving the indication, the companion application may prompt the user 5b to provide further indication that the user 5b desires the system to generate anonymous voice profiles. The device 110b may send data, representing the indication(s), to the server(s) 120. The server(s) 120 may store a representation of the indication(s) for future use as described below. The representation of the indication(s) may be associated with a group profile identifier in storage. By extension, the representation of the indication(s) may be associated with one or more device identifiers associated with the group profile identifier.

At runtime and after receiving the one or more indications, the user 5a may speak a user input (represented as audio 11 in FIGS. 1A and 1B). The device 110a may receive the audio 11 and generate audio data representing the audio 11. The device 110a may send the audio data to the server(s) 120, which the server(s) 120 receives (130).

The server(s) 120 may attempt to identify the user 5a that provided the user input represented in the audio data. As part of user recognition processing, the server(s) 120 may generate (132) a user recognition feature vector (or other user recognition feature data) representing characteristics of the speech represented in the audio data. A feature vector may be a fixed length representation of speech and may be agnostic to what was actually spoken. The server(s) 120 may determine (134) similarities of the user recognition feature vector with respect to one or more other feature vectors, with each of the other feature vectors representing a different explicit voice profile or different anonymous voice profile already generated by the system. These similarities may be represented as confidence values. For example, a first confidence value may represent a similarity of the user recognition feature vector with respect to a feature vector of a first explicit or anonymous voice profile, a second confidence value may represent a similarity of the user recognition feature vector with respect to a feature vector of a second explicit or anonymous voice profile, and so on. A confidence value may be a numeric value (e.g., on a scale of 0-1) or a binned value (e.g., low, medium, or high).

The server(s) 120 may store a vast amount of anonymous and/or explicit voice profiles. To decrease latency, the server(s) 120 may determine similarities of the present user input's user recognition feature vector with respect to only voice profiles associated with the device 110a that captured the present user input. For example, the server(s) 120 may determine a device identifier associated with the device 110a, determine a group profile (e.g., a household profile) associated with the device identifier, determine one or more feature vectors representing one or more anonymous and/or explicit voice profiles associated with the group profile, and determine similarities of the present user input's user recognition feature vector with respect to the determined one or more feature vectors.

The server(s) 120 may determine (136) user recognition has failed. In other words, the server(s) 120 may determine that none of the computed confidence values satisfy a condition. A condition may correspond to a threshold confidence value, a range of values, etc. Thus, such determination may correspond to determining none of the computed confidence values (or at least the greatest confidence value) satisfy a threshold confidence value, determining none of the computed confidence values (or at least the greatest confidence value) are within a range of values, etc. Like the individual confidence values, the threshold confidence value may be a numeric value or a binned value.

The server(s) 120 performs (138) an action(s) responsive to the user input. Since user recognition failed, the action may not be customized to any particular user (e.g., the action may simply be customized to the substance of the user input).

The server(s) 120 may also determine (140) permission has been provided to generate anonymous voice profiles. The server(s) 120 may determine a device identifier of the device 110a that captured the user input, may determine a group profile identifier associated with the device identifier, and may determine the device identifier and/or group profile identifier is associated with data representing a user has permitted the system to generate anonymous voice profiles using user inputs (e.g., audio data from an utterance) associated with the device identifier and/or group profile identifier. Based on determining user recognition has failed and based on determining permission has been provided, the server(s) 120 may store (142) the audio data representing the present user input and/or the present user input's user recognition feature vector. The stored audio data and/or user recognition feature vector may be associated with a device identifier (e.g., of the device that captured the user input) and/or a group profile identifier (e.g., a household identifier associated with the device identifier of the device that captured the user input). The server(s) 120 may choose to store audio data, and not feature vectors generated therefrom, at step 142 because it may be computationally cheaper to store audio data rather than feature vectors. Moreover, a system may present feature vectors in different manners as more data becomes available to the system. Thus, if the server(s) 120 stores feature vectors at step 142, there is a chance that the stored feature vectors may not be relevant to offline processing performed later (e.g., the offline processing may be configured to operate with respect to feature vectors of a different form than the feature vectors stored at step 142).

The above described processing may be performed over time with respect to various user inputs received by a device 110a or group of devices 110a (e.g., group of devices 110a associated with a same group profile, such as a household profile). As such, the server(s) 120 may accumulate and store various user recognition feature vectors representing user inputs that could not be attributed to any already stored voice profile (either anonymous or explicit). The storage may be updated with a new batch of user recognition feature vectors on a periodic basis (e.g., every 30 minutes, once any hours, etc.)

During offline operations, the server(s) 120 may determine (144) at least a threshold number of user inputs, associated with a group profile identifier, have been stored. For example, the server(s) 120 may determine audio data, representing at least a threshold number of user inputs associated with a group profile identifier, have been stored. For further example, the server(s) 120 may determine at least a threshold number of user recognition feature vectors, associated with a group profile identifier, have been stored.

After determining at least a threshold number of user inputs have been stored for a group profile identifier, the server(s) 120 may identify (146) a portion of associated stored user inputs (e.g., associated based on speech characteristics). For example, the server(s) 120 may identify a portion of stored user recognition feature vectors (with respect to which user recognition failed at runtime) representing the same or similar speech characteristics. If the server(s) 120 stored audio data at step 142, the server(s) 120 may generate user recognition feature vectors, representing the stored audio data, prior to performing step 146.

The server(s) 120 may generate (146) an anonymous voice profile using the similar or identical user recognition feature vectors (or the audio data from which the user recognition feature vectors were generated) identified in step 146. User recognition feature vector similarity may be determined using probabilistic linear discriminant analysis (PLDA) scoring. To generate an anonymous voice profile, the server(s) 120 may generate a new feature vector (e.g., an anonymous voice profile feature vector) based on the individual similar or identical user recognition feature vectors (each representing a different user input). A user recognition feature vector may be considered similar or identical to another feature vector if PLDA scoring (or another analysis) results in a high confidence value (e.g., a confidence value satisfying a threshold confidence).

Figure 2:
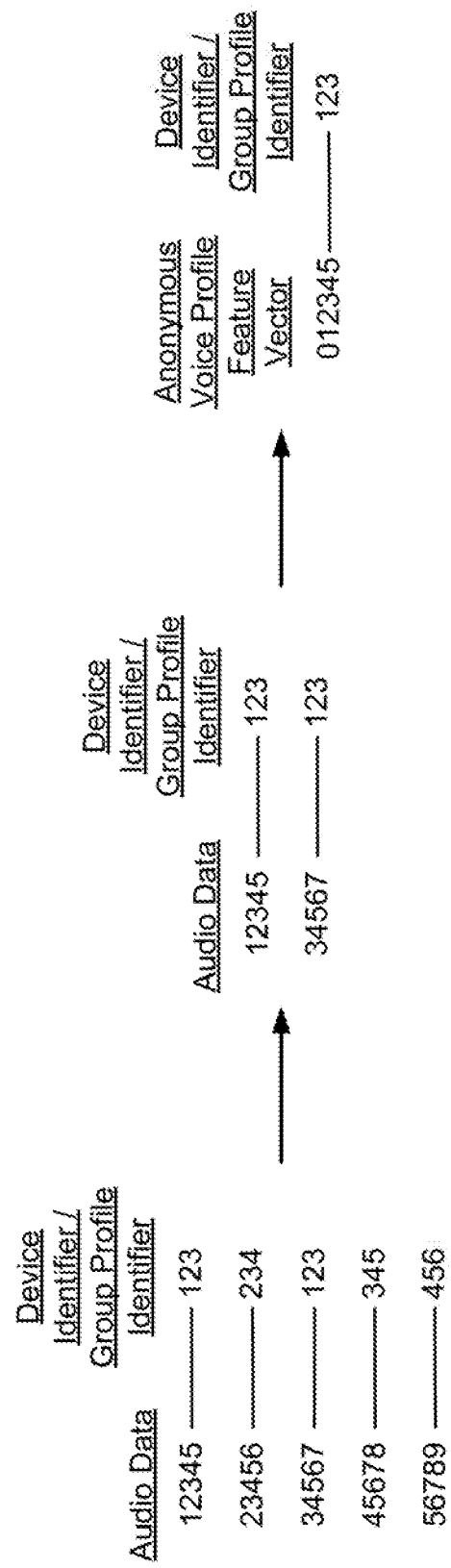
FIG. 2 is a conceptual diagram illustrating the generation of an anonymous voice profile feature vector from various feature vectors representing different user inputs according to embodiments of the present disclosure.

The anonymous voice profile feature vector may be associated with a newly generated anonymous voice profile identifier. FIG. 2 conceptually illustrates how the server(s) 120 generates an anonymous voice profile feature vector from audio data representing various user inputs. As such, it will be appreciated that the teachings herein enable a system to take vast amounts of user recognition feature vectors (representing various user inputs) and reduce them down to particular anonymous voice profile feature vectors.

The above described offline operations may be performed each time one or more new user recognition feature vectors are stored by the system. Alternatively, the foregoing offline operations may be performed on a periodic basis, regardless of when new user recognition feature vectors are stored by the system.

In certain configurations, the server(s) 120 may not generate an anonymous voice profile feature vector unless an amount of similar or identical user recognition feature vectors, from which to generate the anonymous voice profile feature vector, satisfies a condition (e.g., there is at least a threshold amount of similar or identical user recognition feature vectors from which to generate the anonymous voice profile feature vector). For example, the server(s) 120 may be configured to generate an anonymous voice profile feature vector only if there are 10 or more similar or identical user recognition feature vectors from which to generate the anonymous voice profile feature vector.

In at least some instances, the server(s) 120 may not generate an anonymous voice profile feature vector unless there is a sufficient diversity of speech. After the server(s) 120 receives audio data representing a user input, the server(s) 120 may perform ASR processing on the audio data to generate text data, and may perform NLU processing on the text data to generate NLU results data. The NLU results data may include an intent indicator representing an intent of the speech. Illustrative intents include <PlayMusic>, <OutputWeather>, <BookReservation>, as well as others. Audio data (representing a user input with respect to which user recognition failed) may be associated with a corresponding intent indicator representing the user input as illustrated in FIG. 4. The server(s) 120 may be configured to generate an anonymous voice profile feature vector only if similar or identical user recognition feature vectors (from which the anonymous voice profile feature vector is to be generated) are associated with an amount of different intent indicators that satisfy a condition (e.g., a threshold amount of different intent indicators). Such diversity is beneficial because a diversity of intents is associated with a diversity of speech, a diversity of speech is associated with a diversity of sounds, and a diversity of sounds is associated with a more accurate anonymous voice profile feature vector.

Audio data may also be associated with a number of speech frames of the audio data, as illustrated in FIG. 4. If a user recognition feature vector is generated from audio data that does not include many frames, the user recognition feature vector may not be an accurate representation of the voice of the user that provided the user input. As such, the server(s) 120 may be configured to use a user recognition feature vector to generate an anonymous voice profile feature vector only if the user recognition feature vector was generated from audio data satisfying a condition (e.g., including at least a threshold amount of frames). In some configurations, the server(s) 120 may be configured to determine the amount of frames of audio data and may only store a user recognition feature vector generated therefrom (for later use in generating an anonymous user profile feature vector) if the audio data satisfied a condition (e.g., included at least a threshold amount of frames).

Audio data representing a user input may be associated with various data in storage (as illustrated in FIG. 4). The various data may include audio-based data, such as a number of speech frames and a signal-to-noise ratio. The various data may also or alternatively include non-audio data, such as a time when the audio data was generated, a date when the audio data was generated, a location of a device that generated the audio data, etc. This various data may be used in generating a user recognition feature vector representing the audio data associated with the various data.

If the server(s) 120 determines a user recognition feature vector is associated with an intent indicator represented in a blacklist of intents, the server(s) 120 may not consider the user recognition feature vector when generating an anonymous voice profile feature vector. Illustrative blacklist intents include a <Stop> intent, a <Cancel> intent, and the like as such intents are likely associated with relatively minimal amounts of speech, which may be minimally beneficial in generating an accurate anonymous voice profile feature vector.

If the server(s) 120 determines a user recognition feature vector is not associated with an intent indicator, the server(s) 120 may not consider the user recognition feature vector when generating an anonymous voice profile feature vector. NLU processing's inability to determine an intent of a user input may be attributable to user input audio data of a relatively bad quality. The better the audio quality, the more accurate a feature vector generated therefrom may be in user recognition. Thus, not using a user recognition feature vector generated from "relatively bad quality" audio data in the generation of an anonymous voice profile feature vector may increase the accuracy of the anonymous voice profile feature vector as compared to if the relatively bad quality user recognition feature vector was used.

A user's speech includes the same speech characteristics. Thus, similar or identical user recognition feature vectors may be attributed to a single user of the system. As such, an anonymous voice profile may be attributed to a single user of the system, even though the system does not know the user's identity. Since the system does not know the user's identity, an anonymous voice profile identifier may not be associated with any particular user profile identifier. Instead, an anonymous voice profile identifier may be associated with one or more device identifiers (e.g., of the device(s) that captured the user inputs used to generated the anonymous voice profile) and/or a group profile identifier (e.g., associated with the device identifier(s) of the device(s) that captured the user inputs used to generated the anonymous voice profile.

Figure 3:
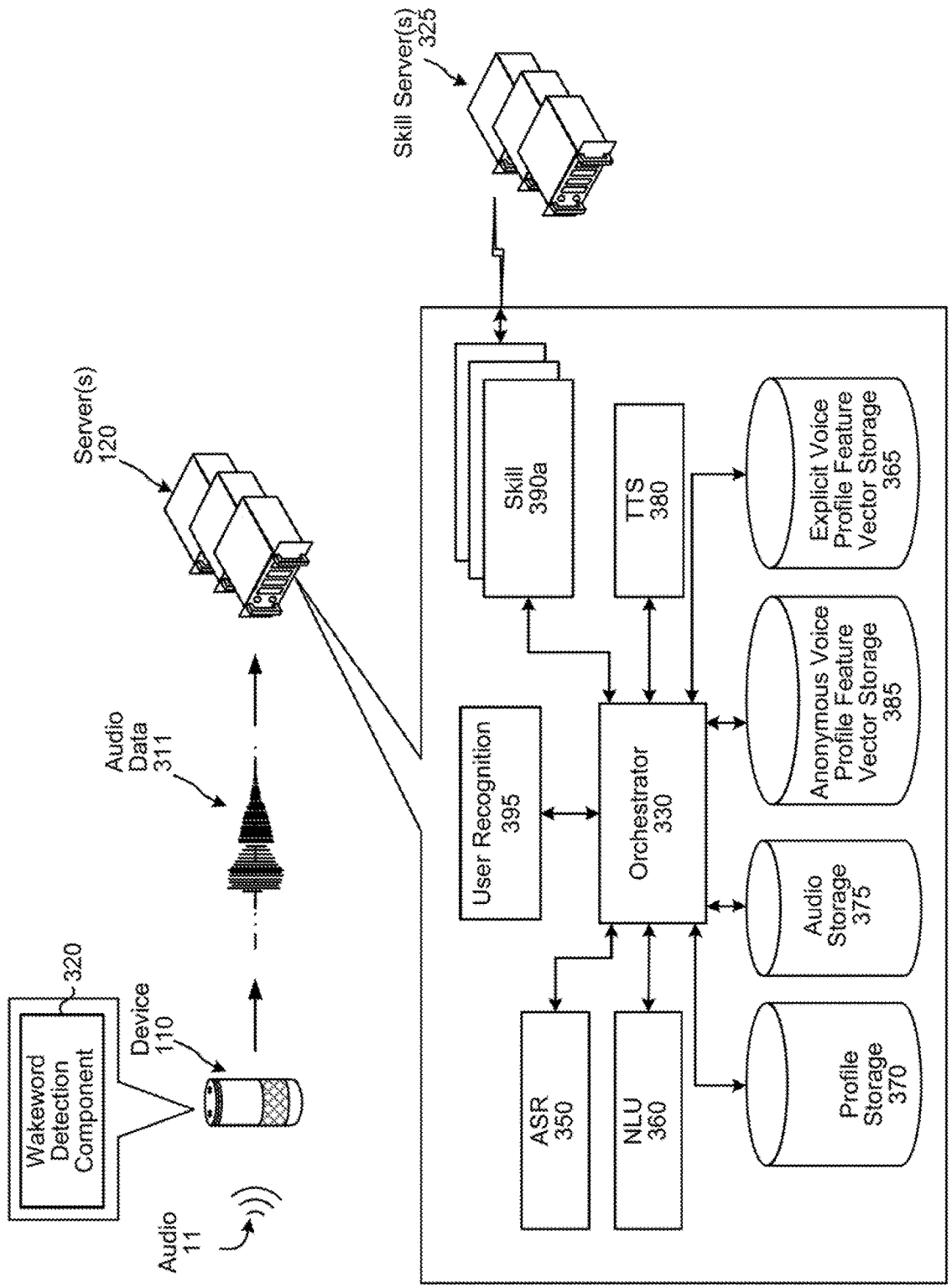
FIG. 3 is a conceptual diagram of components of a system according to embodiments of the present disclosure.

The system may operate using various components as described in FIG. 3. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 320 to perform wakeword detection to determine when a user intends to speak an input to the device 110. The wakeword detection component 320 is a specific example of a keyword detection component. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 311, representing the audio 11, to the server(s) 120. The audio data 311 may include data corresponding to the wakeword, or the portion of the audio corresponding to the wakeword may be removed by the device 110 prior to sending the audio data 311 to the server(s) 120.

Upon receipt by the server(s) 120, the audio data 311 may be sent to an orchestrator component 330. The orchestrator component 330 may include memory and logic that enables the orchestrator component 330 to transmit various pieces and forms of data to various components of the system, as well as perform other operations as described herein.

The orchestrator component 330 sends the audio data 311 to an ASR component 350. The ASR component 350 transcribes the audio data 311 into text data. The text data output by the ASR component 350 represents one or more than one (e.g., in the form of an N-best list) ASR hypotheses representing speech represented in the audio data 311. The ASR component 350 interprets the speech in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the speech represented in the audio data 311. The ASR component 350 sends the text data generated thereby to an NLU component 360, for example via the orchestrator component 330. The text data output by the ASR component 350 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 360 attempts to make a semantic interpretation of the phrase(s) or statement(s) represented in the text data input therein. That is, the NLU component 360 determines one or more meanings associated with the phrase(s) or statement(s) represented in the text data based on words represented in the text data. The NLU component 360 determines an intent representing an action that a user desires be performed as well as pieces of the text data that allow a device (e.g., the device 110, the server(s) 120, a skill component 390, a skill server(s) 325, etc.) to execute the intent. For example, if the text data corresponds to "play Adele music," the NLU component 360 may determine an intent that the system output music and may identify "Adele" as an artist. For further example, if the text data corresponds to "what is the weather," the NLU component 360 may determine an intent that the system output weather information associated with a geographic location of the device 110. In another example, if the text data corresponds to "turn off the lights," the NLU component 360 may determine an intent that the system turn off lights associated with the device 110 or the user 5.

The NLU component 360 may send the NLU results data (which may include tagged text data, indicators of intent, etc.) to the orchestrator component 330. The orchestrator component 330 may send the NLU results data to a skill component(s) 390. If the NLU results data includes a single NLU hypothesis, the orchestrator component 330 may send the NLU results data to the skill component(s) 390 associated with the NLU hypothesis. If the NLU results data includes an N-best list of NLU hypotheses, the orchestrator component 360 may send the top scoring NLU hypothesis to a skill component(s) 390 associated with the top scoring NLU hypothesis.

A "skill component" may be software running on the server(s) 120 that is akin to a software application running on a traditional computing device. That is, a skill component 390 may enable the server(s) 120 to execute specific functionality in order to provide data or produce some other requested output. The server(s) 120 may be configured with more than one skill component 390. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 390 may operate in conjunction between the server(s) 120 and other devices, such as the device 110, in order to complete certain functions. Inputs to a skill component 390 may come from speech processing interactions or through other interactions or input sources. A skill component 390 may include hardware, software, firmware, or the like that may be dedicated to a particular skill component 390 or shared among different skill components 390.

In addition or alternatively to being implemented by the server(s) 120, a skill component 390 may be implemented by a skill server(s) 325. Such may enable a skill server(s) 325 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The server(s) 120 may be configured with a single skill component 390 dedicated to interacting with more than one skill servers 325.

Unless expressly stated otherwise, reference to a skill, skill device, or skill component may include a skill component 390 operated by the server(s) 120 and/or skill operated by the skill server(s) 325. Moreover, the functionality described herein as a skill may be referred to using many different terms, such as an action, bot, app, or the like.

The server(s) 120 may include a TTS component 380 that generates audio data (e.g., synthesized speech) from text data using one or more different methods. Text data input to the TTS component 380 may come from a skill component 390, the orchestrator component 330, or another component of the system.

In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The server(s) 120 may include profile storage 370. The profile storage 370 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 370 may include one or more user profiles, with each user profile being associated with a different user identifier. Each user profile may include various user identifying information. Each user profile may also include preferences of the user and/or one or more device identifiers, representing one or more devices of the user.

The profile storage 370 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 370 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include an audio storage 375. As illustrated in FIG. 4, each portion of audio data may be associated with a device identifier and/or group profile identifier. Each portion of audio data may also be associated with an intent indicator (representing an intent of the user input represented in the audio data), a number of frames of the audio data, as well as other data.

Figure 5:
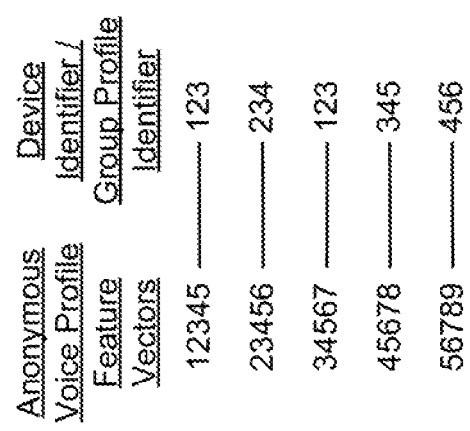
FIG. 5 is a conceptual diagram of an anonymous voice profile feature vector storage according to embodiments of the present disclosure.

The server(s) 120 may include an anonymous voice profile feature vector storage 385. As illustrated in FIG. 5, each anonymous voice profile feature vector (in the anonymous voice profile feature vector storage 385) may be associated with a device identifier and/or group profile identifier.

Figure 6:
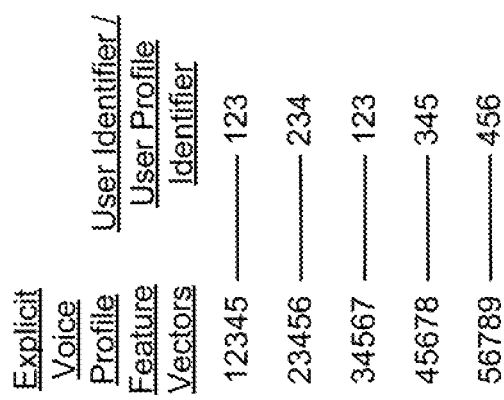
FIG. 6 is a conceptual diagram of an explicit voice profile feature vector storage according to embodiments of the present disclosure.

The server(s) 120 may include an explicit voice profile feature vector storage 365. As illustrated in FIG. 6, each explicit voice profile feature vector (in the explicit voice profile feature vector storage 365) may be associated with a user identifier and/or user profile identifier.

While FIG. 3 illustrates the feature vector storage 375, the anonymous voice profile feature vector storage 385, and the explicit voice profile feature vector storage 365 as being separate storages, one skilled in the art will appreciate that some or all of these storages may be combined. For example, the data described in the anonymous voice profile feature vector storage 385 and the data described in the explicit voice profile feature vector storage 365 may reside in the same storage. In such a configuration, the storage may include indicators designating which profiles in the storage are anonymous voice profiles and which profiles in the storage are explicit voice profiles.

Figure 7:
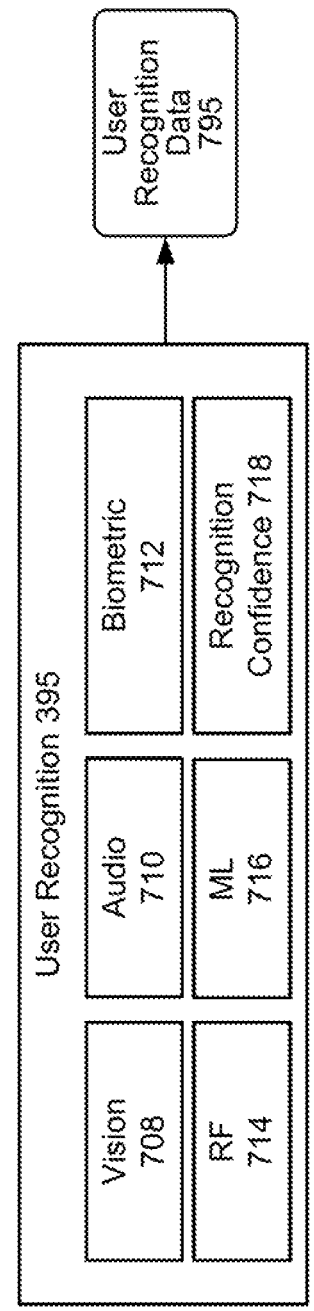
FIG. 7 is a schematic diagram of an illustrative architecture in which sensor data is combined to recognize one or more users according to embodiments of the present disclosure.

The server(s) 120 may include a user recognition component 395 that recognizes one or more users using a variety of data. As illustrated in FIG. 7, the user recognition component 395 may include one or more subcomponents including a vision component 708, an audio component 710, a biometric component 712, a radio frequency (RF) component 714, a machine learning (ML) component 716, and a recognition confidence component 718. In some instances, the user recognition component 395 may monitor data and determinations from one or more subcomponents to determine an identity of one or more users associated with data input to the system. The user recognition component 395 may output user recognition data 795, which may include a user identifier associated with a user the system believes is originating data input to the system. The user recognition data 795 may be used to inform processes performed by the orchestrator 330 or other components of the system.

The vision component 708 may receive data from one or more sensors capable of providing images (e.g., cameras) or sensors indicating motion (e.g., motion sensors). The vision component 708 can perform facial recognition or image analysis to determine an identity of a user and to associate that identity with a user profile associated with the user. In some instances, when a user is facing a camera, the vision component 708 may perform facial recognition and identify the user with a high degree of confidence. In other instances, the vision component 708 may have a low degree of confidence of an identity of a user, and the user recognition component 395 may utilize determinations from additional components to determine an identity of a user. The vision component 708 can be used in conjunction with other components to determine an identity of a user. For example, the user recognition component 395 may use data from the vision component 708 with data from the audio component 710 to identify what user's face appears to be speaking at the same time audio is captured by a device 110 the user is facing for purposes of identifying a user who spoke an input to the system.

The system may include biometric sensors that transmit data to the biometric component 712. For example, the biometric component 712 may receive data corresponding to fingerprints, iris or retina scans, thermal scans, weights of users, a size of a user, pressure (e.g., within floor sensors), etc., and may determine a biometric profile corresponding to a user. The biometric component 712 may distinguish between a user and sound from a television, for example. Thus, the biometric component 712 may incorporate biometric information into a confidence level for determining an identity of a user. Biometric information output by the biometric component 712 can be associated with specific user profile data such that the biometric information uniquely identifies a user profile of a user.

The RF component 714 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 714 the strength of the signal (e.g., as a received signal strength indication (RSSI)). The RF component 714 may use the RSSI to determine an identity of a user (with an associated confidence level). In some instances, the RF component 714 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system for purposes of the system determining who spoke a particular input. Such a registration may occur prior to, during, or after speaking of an input.

The ML component 716 may track the behavior of various users as a factor in determining a confidence level of the identity of the user. By way of example, a user may adhere to a regular schedule such that the user is at a first location during the day (e.g., at work or at school). In this example, the ML component 716 would factor in past behavior and/or trends into determining the identity of the user that provided input to the system. Thus, the ML component 716 may use historical data and/or usage patterns over time to increase or decrease a confidence level of an identity of a user.

In some instances, the recognition confidence component 718 receives determinations from the various components 708, 710, 712, 714, and 716, and may determine a final confidence level associated with the identity of a user. In some instances, the confidence level may determine whether an action is performed. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 795.

The audio component 710 may receive data from one or more sensors capable of providing an audio signal (e.g., one or more microphones) to facilitate recognition of a user. The audio component 710 may perform audio recognition on an audio signal to determine an identity of the user and associated user identifier. In some instances, aspects of the server(s) 120 may be configured at a computing device (e.g., a local server). Thus, in some instances, the audio component 710 operating on a computing device may analyze all sound to facilitate recognition of a user. In some instances, the audio component 710 may perform voice recognition to determine an identity of a user.

The audio component 710 may also perform user identification based on audio data 311 input into the system for speech processing. The audio component 710 may determine scores indicating whether speech in the audio data 311 originated from particular users. For example, a first score may indicate a likelihood that speech in the audio data 311 originated from a first user associated with a first user identifier, a second score may indicate a likelihood that speech in the audio data 311 originated from a second user associated with a second user identifier, etc. The audio component 710 may perform user recognition by comparing audio characteristics representing the audio data 311 to stored audio characteristics of users (associated with the device 110 that captured the spoken user input).

Figure 8:
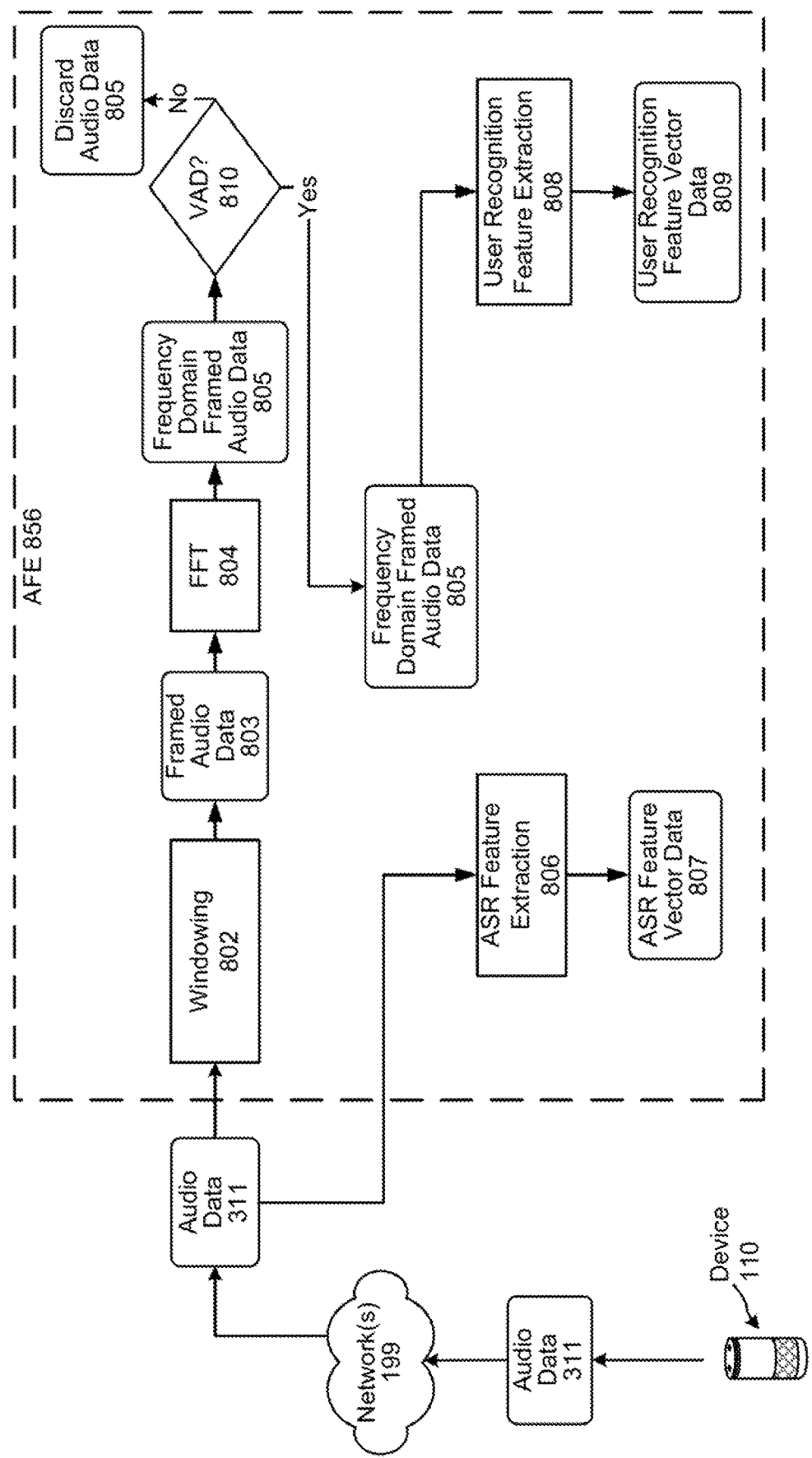
FIG. 8 is a flow diagram illustrating processing performed to prepare audio data for ASR processing and user recognition processing according to embodiments of the present disclosure.

FIG. 8 illustrates processing performed to prepare audio data for ASR processing and user recognition processing. As described, the device 110 sends audio data 311 through a network(s) 199 to the server(s) 120 for processing. The server(s) 120 may include an acoustic front end (AFE) 856 (or other component(s)) that performs various functions on the audio data 311 to prepare the audio data 311 for further downstream processing, such as ASR processing and/or user recognition processing. For example, the AFE 856 may perform (802) windowing functions on the audio data 311 to create framed audio data 803 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 856 may then perform (804) a fast Fourier transform (FFT) that converts the waveforms in each frame of the framed audio data 803 from its original domain (e.g., time) to a representation in a frequency domain (thereby creating frequency domain framed audio data 805). Audio processing techniques other than or in addition to FFT may be used to transform audio data (e.g., waveforms) into data that can be processed as needed.

The server(s) 120 (through the AFE 856 or using another component) then detects (810) whether voice activity (i.e., speech) is present in the post-FFT waveforms (i.e., frequency domain framed audio data 805). In doing so, the server(s) 120 may perform VAD operations discussed above. The VAD detector 810 (or other components) may also be configured in a different order, for example the VAD detector 810 may operate on audio data 311 rather than on frequency domain framed audio data 805, may operate on ASR features, etc. Various different configurations of components are possible. If there is no speech in the audio data, the server(s) 120 discards the frequency domain framed audio data 805 (i.e., removes the audio data from the processing stream). If, instead, the server(s) 120 detects speech in the frequency domain framed audio data 805, the server(s) 120, performs user recognition feature extraction (808) on the frequency domain framed audio data 805. User recognition feature extraction (808) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 809). The feature extraction may continue until voice activity is no longer detected in the audio data, at which point the server(s) 120 may determine that an endpoint of the speech has been reached.

ASR feature extraction (806) may be performed on all the audio data 311 received from the device 110. Alternatively (not illustrated), ASR feature extraction (806) may only be performed on audio data including speech (as indicated by the VAD 810). ASR feature extraction (806) and/or user recognition feature extraction (808) involve determining values (i.e., features) representing qualities of the frequency domain framed audio data 805, along with quantitating those features into values (i.e., feature vectors or audio feature vectors). ASR feature extraction (806) may determine ASR feature vector data 807 useful for ASR processing, and user recognition feature extraction (808) may determine user recognition feature vector data 809 (sometimes called an i-vector) useful for user recognition. The ASR feature vector data 807 and the user recognition feature vector data 809 may be the same feature vectors, different feature vectors, or may include some overlapping feature vectors. A number of approaches may be used to extract feature vectors from the frequency domain framed audio data 805, such as MFCCs, PLP techniques, neural network feature vector techniques, linear discriminant analysis, semi-tied covariance matrices, or other approaches known to those skilled in the art.

ASR feature vector data 807 may include a different audio feature vector for each audio frame. Thus, for one 25 ms long audio frame, the ASR feature extraction component 806 may output a single ASR feature vector. The ASR feature vectors 807 output by the ASR feature extraction component 806 may be output to the ASR component 350.

Depending on system configuration, the user recognition feature extraction component 808 may output multiple user recognition feature vectors, for example one such vector for each audio frame. Alternatively, the user recognition feature extraction component 808 may continue to input the frequency domain framed audio data 805 while the utterance is ongoing (e.g., before the endpoint of the speech is reached in the audio data 805). While the audio data 805 for the utterance is input, the user recognition feature extraction component 808 may accumulate or otherwise combine the audio data 805 as it comes in. That is, for a certain frame's worth of audio data 805 that comes in, the user recognition feature extraction component 808 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 808 may depend on what audio qualities are determined to be important for ultimate user recognition. Thus, the user recognition feature extraction component 808 may be trained to isolate and process data that is most useful for user recognition. The output of the user recognition feature extraction component 808 may thus include user recognition feature vector data 809 that includes values for features useful for user recognition. The resulting user recognition feature vector data 809 may then be used for user recognition.

Figure 9:
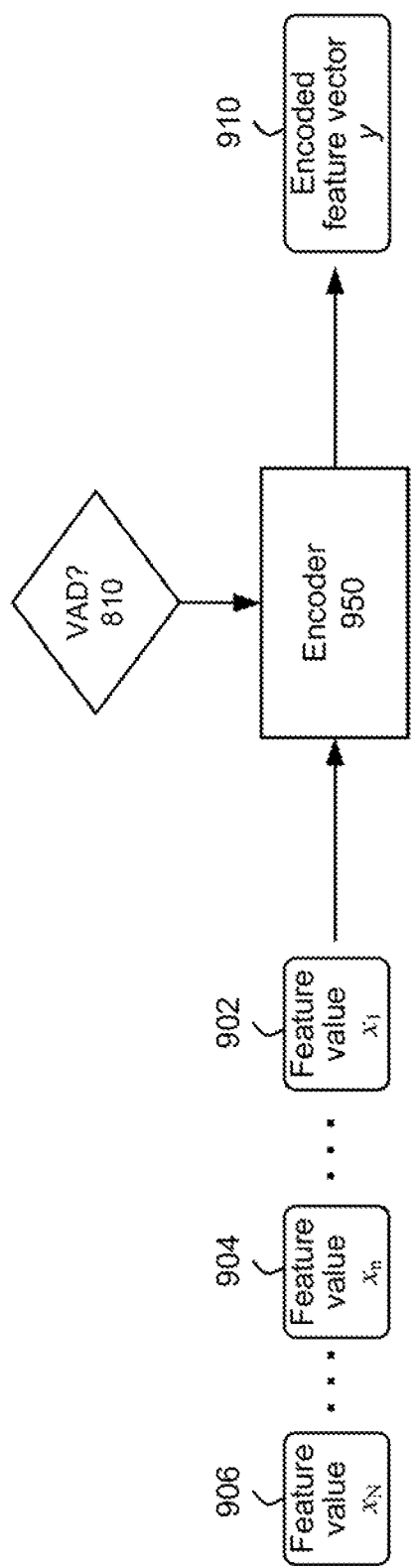
FIG. 9 is a diagram of a vector encoder according to embodiments of the present disclosure.

The user recognition feature vector data 809 may include multiple vectors each corresponding to different portions of the utterance. Alternatively, the user recognition feature vector data 809 may be a single vector representing audio qualities of the utterance. Referring to FIG. 9, the single vector may be created using an encoder 950 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 9, feature values 902 through 906 (which may include feature vectors of audio data 311, frequency domain framed audio data 805, or the like) may be input into an encoder 950 which will output an encoded feature vector 910 that represents the input feature values. The VAD 810 may be an input into the encoder 950 such that the encoder 950 may only operate when feature values input therein correspond to speech. The individual feature values (e.g., 902-906) may correspond to specific audio frames. Regardless of how many feature values are input, any particular encoder 950 will be configured to output vectors of the same size, thus ensuring a continuity of output encoded vector size from any particular encoder 950 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 950 may be implemented as a neural network (NN), recurrent neural network (RNN), GMM, or other model. One particular example is a long short-term memory (LSTM) RNN. There are a variety of ways for the encoder 950 to consume the encoder input, including but not limited to:

linear, one direction (forward or backward),
bi-linear, essentially the concatenation of a forward and a backward embedding, or
tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 9 illustrates operation of the encoder 950. The input feature value sequence, starting with feature value $x_1$ 902, continuing through feature value $x_n$ 904, and concluding with feature value $x_N$ 906 is input into the encoder 950. The encoder 950 may process the input feature values as noted above. The encoder 950 outputs the encoded feature vector y 910, which is a fixed length feature vector of length F. Thus, the user recognition feature extraction component 808 may include an encoder 950 that receives audio feature values for a particular utterance as input, and outputs a fixed length encoded feature vector y 910, which may be the user recognition feature/vector data 809. Thus, in certain system configurations, no matter how long the utterance is, or how many acoustic frames worth of feature values are input into the encoder 950, the output feature vector 910/809 will be of the same length, thus allowing for more ease of performing user recognition by the user recognition component 395. To allow for robust system operation, a final vector 809 may include many dimensions (e.g., several hundred), thus providing many datapoints for downstream consideration.

To determine the user recognition feature vector data 809, the system may (for example using the VAD detector 810) determine that voice activity is detected in input audio. This may indicate the beginning of the utterance, thus resulting in the system determining that the input utterance starts at a first point in audio data. Audio processing (for example by windowing 802, FFT 804, ASR feature extraction 806, user recognition feature extraction 808, ASR processing, or the like) may continue on the utterance audio data starting at the first point and continuing until the VAD detector 810 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 810, or other component, may signal the user recognition feature extraction component 808 when the beginpoint and/or endpoint is detected so that the user recognition feature extraction component 808 may begin processing audio data starting at the beginpoint and ending at the endpoint. Further, audio frames during the utterance that do not include speech may be filtered out by the VAD detector 810 and thus not considered by the ASR feature extraction component 806 and/or user recognition feature extraction component 808. The resulting accumulated/processed speech audio data for the utterance (from beginpoint to endpoint) may then be represented in a single feature vector for the user recognition feature vector data 809, which may then be used for user recognition.

Figure 10:
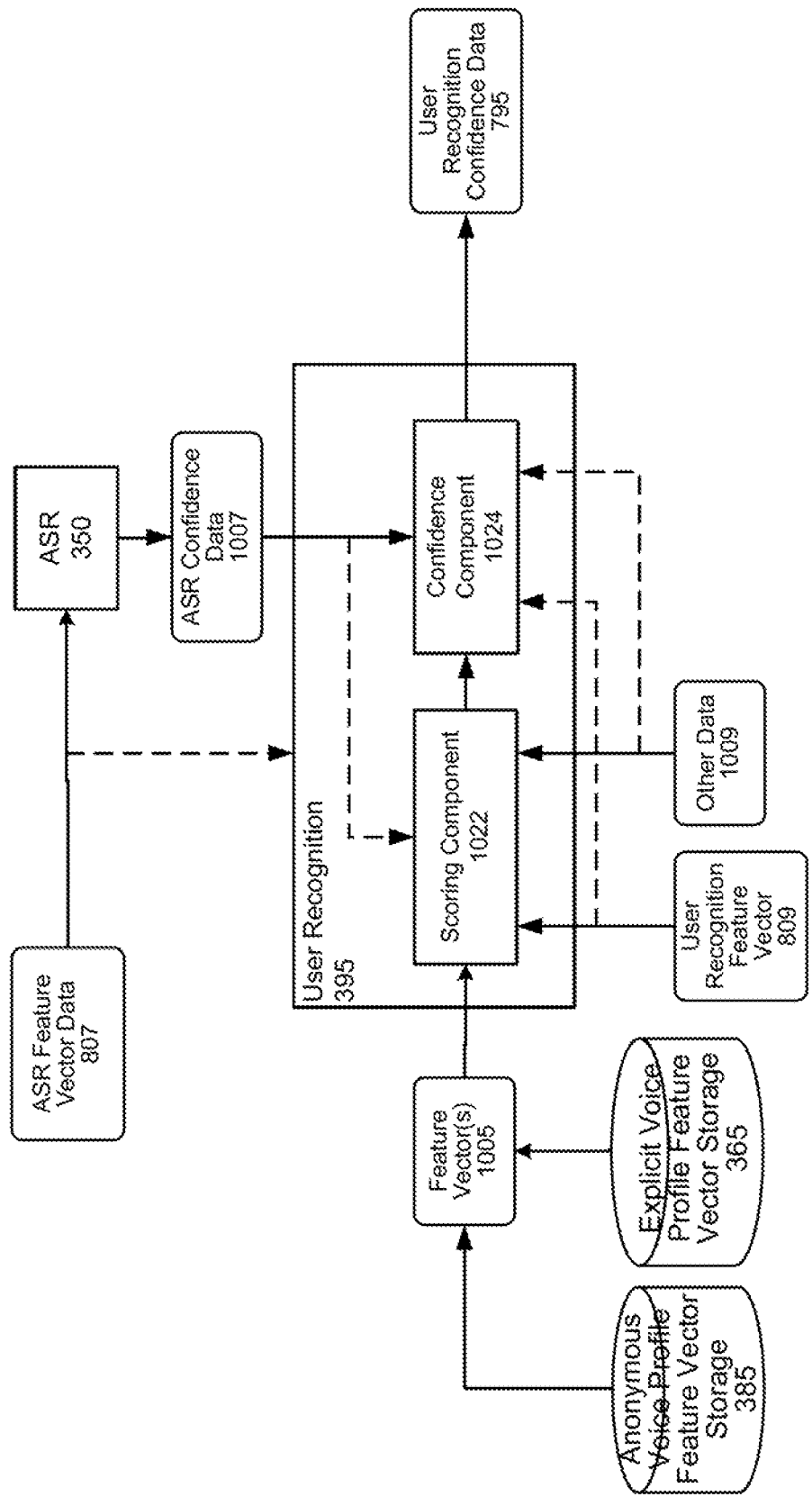
FIG. 10 is a system flow diagram illustrating user recognition according to embodiments of the present disclosure.

FIG. 10 illustrates user recognition as performed by the server(s) 120. The ASR component 350 performs ASR on the ASR feature vector data 807 as described above. ASR confidence data 1007 is passed to a user recognition component 395.

The user recognition component 395 performs user recognition using various data including the user recognition feature vector data 809, feature vectors 1005 representing explicit and/or anonymous voice profiles, the ASR confidence data 1007, and other data 1009. The user recognition component 395 may then output user recognition confidence data 795 which reflects a certain confidence that the user input was spoken by one or more particular users. The user recognition confidence data 795 may include one or more user identifiers, one or more user profile identifiers, one or more explicit voice profile identifiers, and/or one or more anonymous voice profile identifiers. Each identifier in the user recognition confidence data 795 may be associated with a respective confidence value, representing a likelihood that the user input corresponds to the identifier. A confidence value may be a numeric or binned value as discussed herein.

The feature vector(s) 1005 input to the user recognition component 395 may correspond to one or more anonymous voice profiles (stored in anonymous voice profile feature vector storage 385) and/or one or more explicit voice profiles (stored in explicit voice profile feature vector storage 365). The user recognition component 395 may use the feature vector(s) 1005 to compare against the user recognition feature vector 809, representing the present user input, to determine whether the user recognition feature vector 809 corresponds to one or more of the feature vectors 1005 of the anonymous and/or explicit voice profiles.

Each feature vector 1005 805 may be the same size as the user recognition feature vector 809. Thus, for example, if the user recognition feature vector 809 is of size F (for example encoded by the encoder 950), a feature vector 1005 may also be of size F.

To perform user recognition, the user recognition component 395 may determine the device 110 from which the audio data 311 originated. For example, the audio data 311 may be associated with metadata including a device identifier representing the device 110. Either the device 110 or the server(s) 120 may generate the metadata. The server(s) 120 may determine a group profile identifier associated with the device identifier, may determine user profile identifiers associated with the group profile identifier, and may include the group profile identifier and/or the user profile identifiers in the metadata. The server(s) 120 may associate the metadata with the user recognition feature vector 809 produced from the audio data 311. The user recognition component 395 may send a signal to the anonymous voice profile feature vector storage 385 and/or the explicit voice profile feature vector storage 365, with the signal requesting only feature vectors 1005 associated with the device identifier, the group profile identifier, and/or the user profile identifiers represented in the metadata. This limits the universe of possible feature vectors 1005 the user recognition component 395 should consider at runtime and thus decreases the amount of time to perform user recognition by decreasing the amount of feature vectors 1005 needed to be processed. Alternatively, the user recognition component 395 may access all (or some other subset of) feature vectors 1005 available to the user recognition component 395. However, accessing all feature vectors 1005 will likely increase the amount of time needed to perform user recognition based on the magnitude of feature vectors to be processed.

The user recognition component 395 may attempt to identify the user that spoke the speech represented in the audio data 311 by comparing the user recognition feature vector 809 to the received feature vector(s) 1005. The user recognition component 395 may include a scoring component 1022 that determines respective scores indicating whether the user input (represented by the user recognition feature vector 809) was spoken by one or more particular users (represented by the feature vector(s) 1005). The user recognition component 395 may also include a confidence component 1024 that determines an overall accuracy of user recognition operations (such as those of the scoring component 1022) and/or an individual confidence value with respect to each user potentially identified by the scoring component 1022. The output from the scoring component 1022 may include a different confidence value for each received feature vector 1005. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 1022 and confidence component 1024 may be combined into a single component or may be separated into more than two components.

The scoring component 1022 and confidence component 1024 may implement one or more trained machine learning models (such neural networks, classifiers, etc.) as known in the art. For example, the scoring component 1022 may use probabilistic linear discriminant analysis (PLDA) techniques. PLDA scoring determines how likely it is that the user recognition feature vector 809 corresponds to a particular feature vector 1005. The PLDA scoring may generate a confidence value for each feature vector 1005 considered and may output a list of confidence values associated with respective user profile identifiers, anonymous voice profile identifiers, and/or explicit voice profile identifiers. The scoring component 1022 may also use other techniques, such as GMMs, generative Bayesian models, or the like, to determine confidence values.

The confidence component 8104 may input various data including information about the ASR confidence 1007, speech length (e.g., number of frames or time of the user input), audio condition/quality data (such as signal-to-interference data or other metric data), fingerprint data, image data, or other factors to consider how confident the user recognition component 395 is with regard to the confidence values linking users to the user input. The confidence component 1024 may also consider the confidence values and associated identifiers output by the scoring component 1022. Thus, the confidence component 1024 may determine that a lower ASR confidence 1007, or poor audio quality, or other factors, may result in a lower confidence of the user recognition component 395. Whereas a higher ASR confidence 1007, or better audio quality, or other factors, may result in a higher confidence of the user recognition component 395. Precise determination of the confidence may depend on configuration and training of the confidence component 1024 and the models implemented thereby. The confidence component 1024 may operate using a number of different machine learning models/techniques such as GMM, neural networks, etc. For example, the confidence component 1024 may be a classifier configured to map a score output by the scoring component 1022 to a confidence value.

The user recognition component 395 may output user recognition confidence data 795 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user recognition component 395 may output user recognition confidence data 795 with respect to received feature vector 1005. The user recognition confidence data 795 may include numeric confidence values (e.g., 0.0-1.0, 0-1000, or whatever scale the system is configured to operate). Thus the user recognition confidence data 795 may output an N-best list of potential users with numeric confidence values (e.g., user profile identifier 123—0.2, anonymous voice profile identifier 234—0.8). Alternatively or in addition, the user recognition confidence data 795 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 395 may output an N-best list of potential users with binned confidence value (e.g., user profile identifier 123—low, anonymous voice profile identifier 234—high). Combined binned and numeric confidence value outputs are also possible. Rather than a list of identifiers and their respective confidence values, the user recognition confidence data 795 may only include information related to the top scoring identifier as determined by the user recognition component 395. The user recognition component 395 may also output an overall confidence value that the individual confidence values are correct, where the overall confidence value indicates how confident the user recognition component 395 is in the output results. The overall confidence value may be determined by the confidence component 1024.

The confidence component 1024 may determine differences between individual confidence values when determining the user recognition confidence data 795. For example, if a difference between a first confidence value and a second confidence value is large, and the first confidence value is above a threshold confidence value, then the user recognition component 395 is able to recognize a first user (associated with the feature vector 1005 associated with the first confidence value) as the user that spoke the user input with a much higher confidence than if the difference between the confidence values were smaller.

The user recognition component 395 may perform thresholding to avoid incorrect user recognition results being output. For example, the user recognition component 395 may compare a confidence value output by the confidence component 1024 to a threshold confidence value. If the confidence value does not satisfy (e.g., does not meet or exceed) the threshold confidence, the user recognition component 395 may not output user recognition confidence data 795, or may only include in that data 795 an indication that a user speaking the user input could not be recognized. Further, the user recognition component 395 may not output user recognition confidence data 795 until enough user recognition feature vector data 809 is accumulated and processed to verify a user above a threshold confidence. Thus the user recognition component 395 may wait until a sufficient threshold quantity of audio data of the user input has been processed before outputting user recognition confidence data 795. The quantity of received audio data may also be considered by the confidence component 1024.

The user recognition component 395 may be defaulted to output binned (e.g., low, medium, high) user recognition confidence values. However, such may be problematic in certain situations. For example, if the user recognition component 395 computes a single binned confidence value for multiple feature vectors 1005, the system may not be able to effectively determine which user originated the user input. In this situation, the user recognition component 395 may be configured to override its default setting and output numeric confidence values. This enables the system to determine a user associated with the highest numeric confidence value originated the user input.

The user recognition component 395 may use other data 1009 to inform user recognition processing. Thus, a trained model or other component of the user recognition component 395 may be trained to take other data 1009 as an input feature when performing recognition. Other data 1009 may include a wide variety of data types depending on system configuration and may be made available from other sensors, devices, or storage. The other data 1009 may include a time of day at which the audio data 311 was generated by the device 110 or received from the device 110, a day of a week in which the audio data audio data 311 was generated by the device 110 or received from the device 110, etc.

The other data 1009 may include image data or video data. For example, facial recognition may be performed on image data or video data received from the device 110 from which the audio data 311 was received (or another device). Facial recognition may be performed by the user recognition component 395, or another component of the server(s) 120. The output of facial recognition processing may be used by the user recognition component 395. That is, facial recognition output data may be used in conjunction with the comparison of the user recognition feature vector 809 and one or more feature vectors 1005 to perform more accurate user recognition.

The other data 1009 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1009 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 311 was received is a smart watch or vehicle belonging to a user A, the fact that the device 110 belongs to user A may increase a user recognition confidence value associated with user A and/or decrease a user recognition confidence value associated with user B.

The other data 1009 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 311 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 1009 may include addition data representing activity of a particular user that may be useful in performing user recognition. For example, if a user has recently entered a code to disable a home security alarm, and the audio data 311 was received from a device 110 represented in a group profile associated with the home, signals from the home security alarm about the disabling user, time of disabling, etc. may be reflected in the other data 1009 and considered by the user recognition component 395. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 1009 and considered by the user recognition component 395.

Depending on system configuration, the other data 1009 may be configured to be included in the user recognition feature vector data 809 (for example using the encoder 950) so that all the data relating to the user input to be processed by the scoring component 1022 may be included in a single feature vector. Alternatively, the other data 1009 may be reflected in one or more different data structures to be processed by the scoring component 1022.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests.

Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
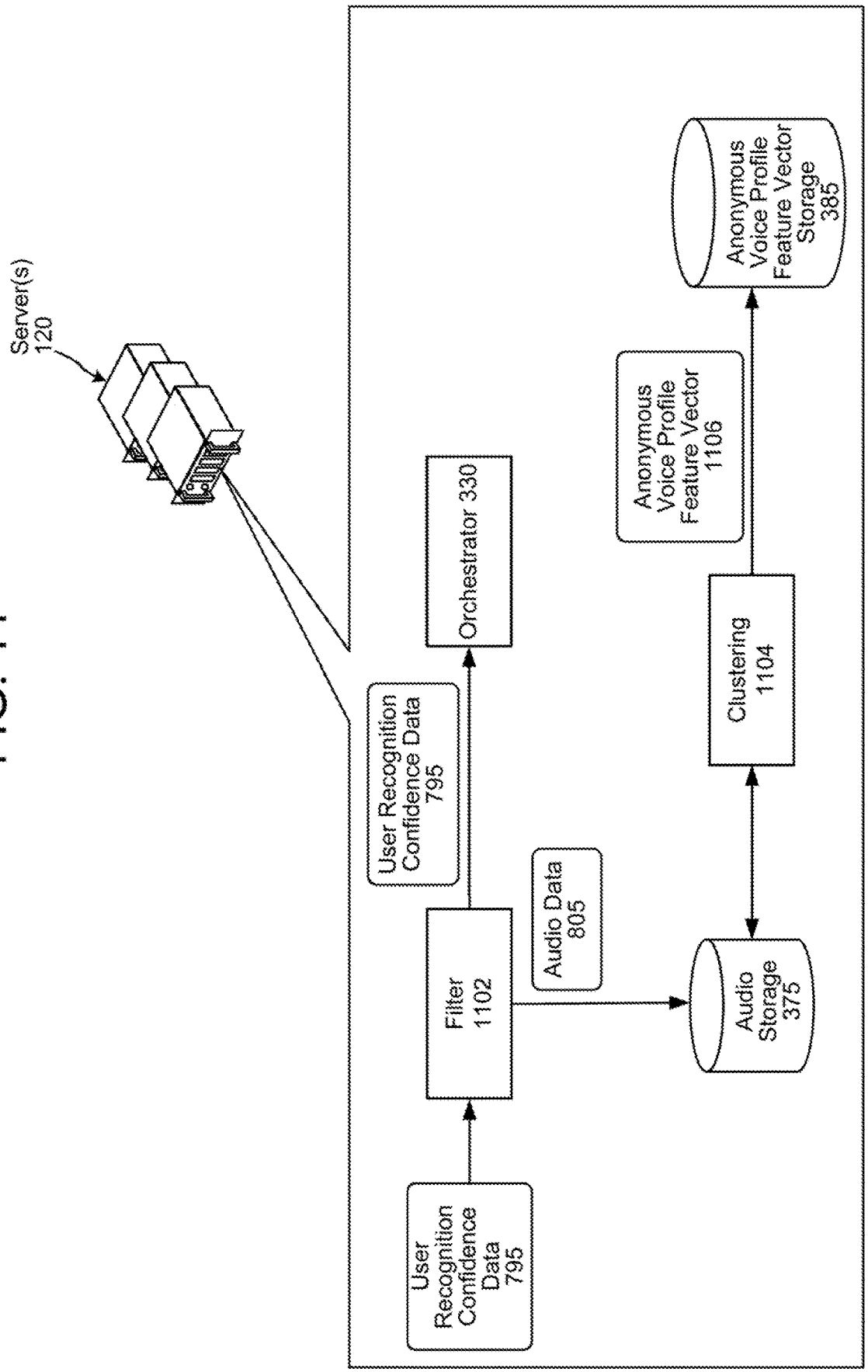
FIG. 11 is a conceptual diagram illustrating the generation of an anonymous voice profile feature vector according to embodiments of the present disclosure.

The user recognition confidence data 795 may be sent to a filter component 1102 (as illustrated in FIG. 11). The filter component 1102 may be configured to determine whether the user recognition feature vector 809 should be stored for later generation of an anonymous voice profile feature vector. The filter component 1102 may determine whether none of the confidence values in the user recognition confidence data 795 satisfy a condition (e.g., a threshold confidence). If none of the confidence values in the user recognition confidence data 795 satisfy the condition, it may be assumed that the user input did not originate from a user associated with either an already generated anonymous voice profile or already generated explicit voice profile.

If the filter component 1102 determines at least one confidence value (in the user recognition confidence data 795) satisfies the condition (e.g., a threshold confidence), the filter component 1102 may send the user recognition data 795 (or a portion thereof) to the orchestrator component 330 for further use in performing an action responsive to the user input. As described above, the user recognition confidence data 795 may include one or more feature vectors. Each feature vector in the user recognition confidence data 795 may be associated with an indicator of whether the feature vector corresponds to an anonymous voice profile feature vector or an explicit voice profile feature vector. Such indicator may be used by the orchestrator component 330 (or another component of the system, such as a skill 390) in performing an action responsive to the user input since anonymous and explicit voice profiles may be associated with different types of data used to personalize user input responses to varying degrees of specificity. For example, an explicit voice profile may be associated with various accounts of a specific user (e.g., a user's electronic calendar, music catalog, etc.) whereas an anonymous voice profile may simply be associated with a system usage history.

If the filter component 1102 determines none of the confidence values (in the user recognition confidence data 795) satisfy a condition (e.g., meet or exceed a threshold confidence (e.g., the filter component 1102 determines the highest confidence value does not satisfy a threshold confidence), the filter component 1102 may cause the audio data 805 (or audio data 311) to be persisted in the audio storage 375. The filter component 1102 may also send an indicator to the orchestrator component 330 that a user could not be recognized. The processing performed by the filter component 1102 may ensure anonymous voice profile generation is only performed using user recognition feature vectors representing speech of users whose voices are unknown to the system.

As described, the filter component 1102 may determine, at runtime, whether audio data (representing a user input) should be persisted in the audio storage 375. Alternatively, the filter component 1102 may perform such processing during offline operations. In such a configuration, the user recognition component 395 may (i) send the user recognition confidence data 795 to the orchestrator component at runtime (allowing the orchestrator component 330 to determine whether a user has been recognized to a sufficient degree) and (ii) cause the audio data (representing the user input) along with associated user recognition confidence data 795 to be stored in the audio storage 375. During offline processing, the filter component 1102 may determine whether none of the confidence values in the user recognition confidence data 795 (or whether the top scoring confidence value) satisfy a condition (e.g., a threshold confidence). If the filter component 1102 determines the top scoring confidence value satisfies a condition (e.g., the threshold confidence), the filter component 1102 may delete the audio data (and associated user recognition confidence data 795) from the audio storage 375. If, instead, the filter component 1102 determines the top scoring confidence value does not satisfy the condition (e.g., threshold confidence), the filter component 1102 may allow the audio data to persist in the audio storage 375, but may delete the associated user recognition confidence data 795. A clustering component 1104 (described below) may be configured to only process with respect to audio data in the audio storage 375 that is not associated with user recognition confidence data 795. This may ensure the clustering component 1104 only processes with respect to feature vectors that the system is confident are not similar to already established anonymous or explicit voice profiles.

The filter component 1102 may process with respect to various user inputs. As such, it will be appreciated that the filter component 1102 may cause vast amounts of audio data to be persisted in the audio storage 375. The filter component 1102 may cause audio data to be associated, in the audio storage 375, with a device identifier of the device 110 that captured the user input represented in the audio data and/or a group profile identifier representing a group profile associated with the device 110.

The audio data persisted in the audio storage 375 may be associated with different users. The server(s) 120 may be configured with a clustering component 1104 configured to cluster user recognition feature vectors (generated from audio data persisted in the audio storage 375) into anonymous voice profiles, with each anonymous voice profile being associated with a different user. The clustering component 1104 may operate during offline operations.

The clustering component 1104 may perform a Density-Based Spatial clustering of Applications with Noise (DBSCAN) to cluster user recognition feature vectors persisted therein. A DBSCAN may generate regions having different densities. A density may be considered a cluster of similar or identical user recognition feature vectors.

DBSCAN has two parameters, ε and minPts. ε dictates when two user recognition feature vectors are considered close enough to be grouped into a single cluster. Items with at least minPts neighbors within a distance of c may be defined as "core points." Connected core points along with their ε-neighbors may form a cluster. By selecting an appropriate minPts, density of clusters can be influenced.

Density may be correlated to an amount of user recognition feature vectors making up a cluster. In other words, the denser a cluster is, the more user recognition feature vectors make up the cluster. The clustering component 1104 may only generate an anonymous voice profile feature vector from a cluster of similar user recognition feature vectors if the cluster has at least a minimum number of user recognition feature vectors. This ensures a resulting anonymous voice profile feature vector is sufficiently robust for use in later user recognition processing as described with respect to FIG. 10. Thus, the clustering component 1104 may be configured to only generate an anonymous voice profile feature vector from a cluster if the cluster has at least a minimum density.

The clustering component 1104 may be configured to perform one or more of user input-to-user similarity processing, user input-to-user input similarity processing, and/or user-to-user similarity processing. To perform these operations, the clustering component 1104 may implement one or more trained machine learning models. In an example, the clustering component 1104 may implement a multi-task DNN model trained to perform each of the foregoing operations.

Features that may be used to train the multi-task DNN may include a PLDA similarly score with a first feature vector and a second feature vector, log(total number of speech frames of estimating the first feature vector), log (total number of speech frames used for estimating the second feature vector), a number of utterances used in estimating the first feature vector, a number of utterances used in estimating the second feature vector, a total number of enrolled users, and a minimum of a difference with PLDA scores of other enrolled users. The log(total number of speech frames of estimating the first feature vector) and the log(total number of speech frames used for estimating the second feature vector) capture an expectation that feature vectors estimated from fewer speech frames are less reliable. The number of utterances used in estimating the first feature vector and the number of utterances used in estimating the second feature vector provide information regarding feature vector estimation. The total number of enrolled users and the minimum of a difference with PLDA scores of other enrolled users are relevant to the PLDA similarity scoring. The minimum of a difference with PLDA scores of other enrolled users capture information about how close other enrolled users match a feature vector of a particular user input, thereby lowering misidentification rates. When the number of enrolled users is less than 2, the minimum of a difference with PLDA scores of other enrolled users may be assigned a constant value equal to a difference of maximum and minimum of PLDA values observed on a development set.

A network with 3 hidden layers and 5 hidden nodes per layer may be sufficient. Output of the network may be a binary value depending on whether two compared user recognition feature vectors correspond to the same user (e.g., a binary output of 1) or not (e.g., a binary output of 0). The multi-task DNN may be trained using back-propagation with cross-entropy objective function, or one or more other training techniques.

If the clustering component 1104 determines a cluster of user recognition feature vectors satisfying all requisite conditions (e.g., including at least a threshold number of different intent indicators, including at least a threshold number of different user recognition feature vectors, etc.), the clustering component 1104 may generate an anonymous voice profile feature vector 1106 from the user recognition feature vectors of the cluster. In an example, an anonymous voice profile feature vector may be an average of the underlying user recognition feature vectors. The clustering component 1104 may cause the anonymous voice profile feature vector 1106 to be persisted in the anonymous voice profile feature vector storage 385.

When the clustering component 1104 generates an anonymous voice profile feature vector, the clustering component 1104 may cause the audio data, used to generate the user recognition feature vectors from which the anonymous voice profile feature vector was generated, to be deleted from the audio storage 375. This ensures the audio storage 375 only includes audio data that has not been used to generate an anonymous voice profile feature vector.

The clustering component 1104 (or another component of the system) may assign a particular anonymous voice profile identifier to the anonymous voice profile feature vector 1106. Within the anonymous voice profile feature vector storage 385, the anonymous voice profile feature vector 1106 may be associated with its anonymous voice profile identifier, one or more devices identifiers that captured user inputs represented by the user recognition feature vectors used to generate the anonymous voice profile feature vector 1106, and/or a group profile identifier associated with the device identifier(s).

In at least some instances, the clustering component 1104 may operate, at least partially in parallel, with respect to user recognition feature vectors associated with different group profile identifiers. In at least some configurations, the filter component 1102 and the clustering component 1104 may be implemented as part of the ASR component 350.

As described, the system may be configured to cluster user recognition feature vectors (generated based on audio data) to generate anonymous voice profiles that may be used later by the system in user recognition operations. One skilled in the art will appreciate that the present disclosure is not limited to audio-based user recognition profile generation and use thereof. That is, the teachings of the present disclosure may be applied to non-audio modalities. For example, the teachings disclosed herein may be applied to image-based user recognition profile generation and use thereof. In such application, clustering may be performed solely based on image-based user recognition, or clustering may be performed using both image and audio-based user recognition techniques. Thus, for a given user input, the system may generate an anonymous voice profile and/or anonymous image profile for a user.

Figure 12:
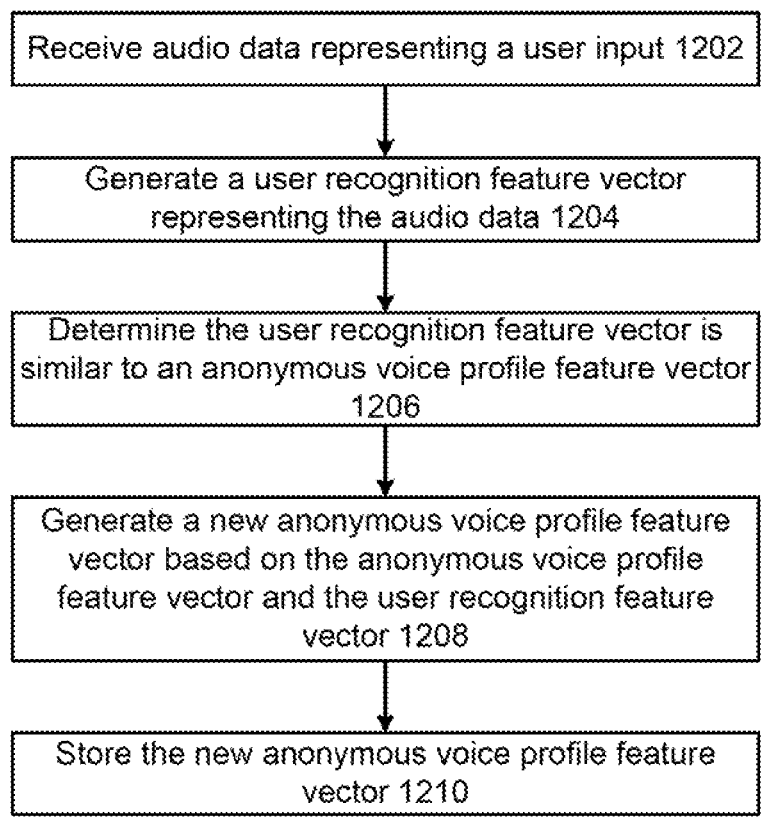
FIG. 12 is a process flow diagram illustrating the updating of an anonymous voice profile according to embodiments of the present disclosure.

An anonymous voice profile feature vector (persisted in the anonymous voice profile feature vector storage 385) may be updated as illustrated in FIG. 12. Updating an anonymous voice profile feature vector may be beneficial in situations where a user's voice changes over time. Updating of the user's anonymous voice profile feature vector may ensure the user's voice changes are captured in the anonymous voice profile feature vector.

After an anonymous voice profile is generated (e.g., an anonymous voice profile feature vector is generated and associated with a particular anonymous voice profile identifier in the anonymous voice profile feature vector storage 385), a device 110 may receive audio representing a spoken user input. The device 110 may generate audio data representing the audio and send the audio data to the server(s) 120, which the server(s) 120 receives (1202). The server(s) 120 may generate (1204) a user recognition feature vector representing the audio data.

The server(s) 120 (and more particularly the user recognition component 395) may determine (1206) the user recognition feature vector is similar to an already generated anonymous voice profile feature vector (persisted in the anonymous voice profile feature vector storage 385). That is, the server(s) 120 may generate a confidence value representing a similarity of the user recognition feature vector to the anonymous voice profile feature vector, and may determine the confidence value satisfies a condition (e.g., a threshold confidence).

The server(s) 120 may thereafter generate (1208) a new anonymous voice profile feature vector based on the previously generated anonymous voice profile feature vector and the user recognition feature vector. Such generation may include averaging the user recognition feature vector with the previously generated anonymous voice profile feature vector. The server(s) 120 may generate a new anonymous voice profile feature vector based on a single new user recognition feature vector that is similar to the previously generated anonymous voice profile feature vector. Alternatively, the server(s) 120 may only generate a new anonymous voice profile feature vector is a threshold number of new user recognition feature vectors are similar to the previously generated anonymous voice profile feature vector. In this situation, the new anonymous voice profile feature vector may be generated using the previously generated anonymous voice profile feature vector and the various new user recognition feature vectors.

The server(s) 120 may store (1210) the new anonymous voice profile feature vector in the anonymous vice profile feature vector storage 385. Since the new anonymous voice profile feature vector is generated at least partially based on the previous anonymous voice profile feature vector, the new anonymous voice profile feature vector may be associated with the same anonymous voice profile identifier that the previous anonymous voice profile feature vector was associated with. Alternatively, a new anonymous voice profile identifier may be generated for and associated with the new anonymous voice profile feature vector.

While the steps of FIG. 12 have been described as being useful in updating an anonymous voice profile feature vector, one skilled in the art will appreciate that the teachings of FIG. 12 may also be useful in updating an explicit voice profile feature vector.

Figure 13:
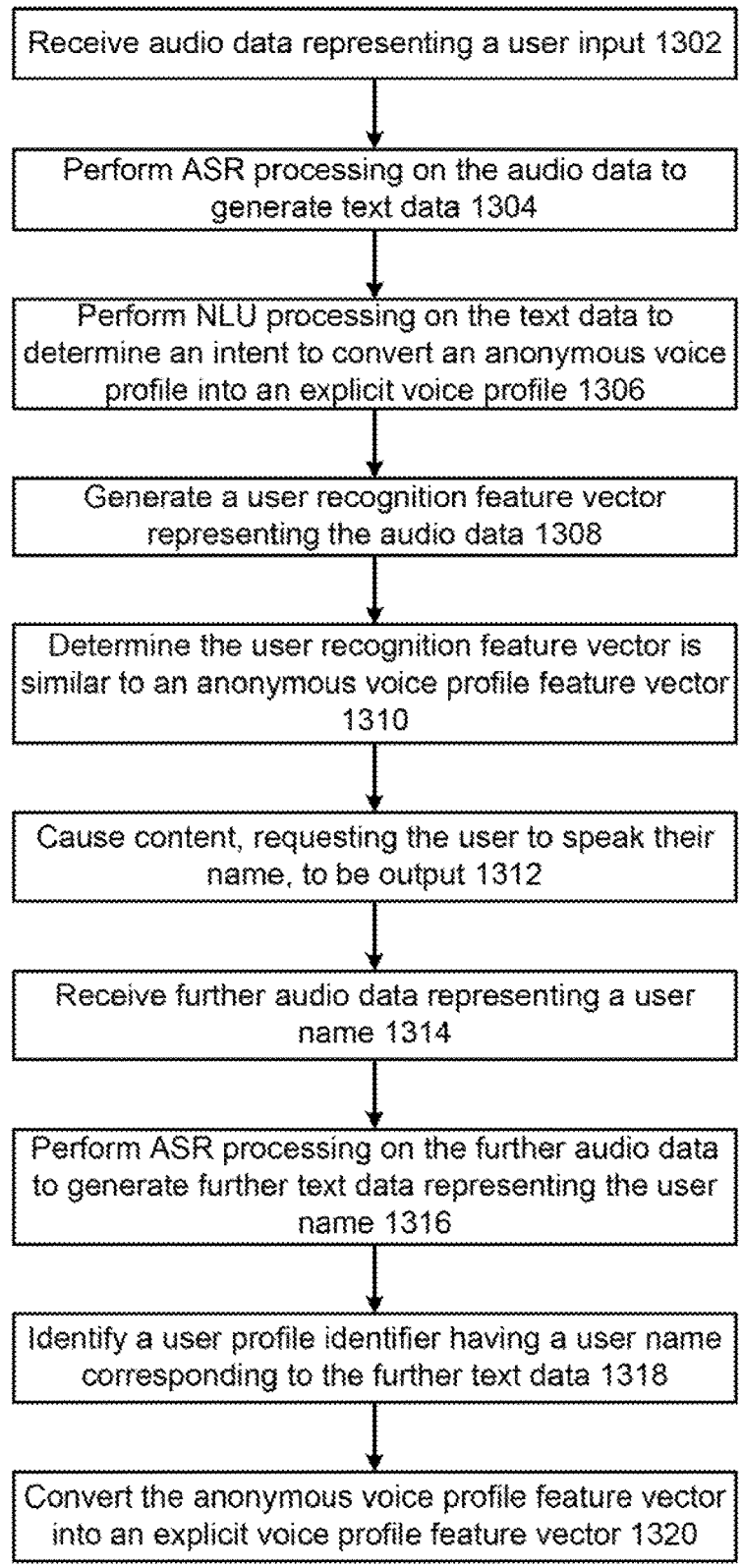
FIG. 13 is a process flow diagram illustrating the conversion of an anonymous voice profile into an explicit voice profile according to embodiments of the present disclosure.

After an anonymous voice profile is generated (e.g., after an anonymous voice profile feature vector is generated and associated with an anonymous voice profile identifier in the anonymous voice profile feature vector storage 385), a user associated with the anonymous voice profile may instruct the system to convert the anonymous voice profile into an explicit voice profile (as illustrated in FIG. 13). A device 110 may receive audio representing a spoken user input. The device 110 may generate audio data representing the audio and may send the audio data to the server(s) 120, which the server(s) 120 receives (1302).

The server(s) 120 (and more particularly the ASR component 350) may perform (1304) ASR processing on the audio data to generate text data. The server(s) 120 (and more particularly the NLU component 360) may perform (1306) NLU processing on the text data to determine the user intends to convert an anonymous voice profile into an explicit voice profile. For example, such intent may be determined from an user input corresponding to "Alexa, learn my name."

The server(s) 120 may generate (1308) a user recognition feature vector representing the audio data and may determine (1310) the user recognition feature vector is similar to an anonymous voice profile feature vector (e.g., associated with a device identifier representing the device 110 that captured the user input and/or associated with a group profile identifier associated with the device identifier). In other words, the server(s) 120 may determine a confidence value representing a similarly between the user recognition feature vector and the anonymous voice profile feature vector, and may determine the confidence value satisfies a condition (e.g., a threshold confidence).

A group profile identifier (associated with the anonymous voice profile feature vector) may be associated with multiple user profile identifiers. Each user profile identifier may be associated with a different user's name. The server(s) 120 may cause (1312) content (e.g., synthesized speech), requesting the user to speak their name, to be output. For example, such synthesized speech (or other outputtable content) may corresponding to "what is your name."

The device 110 may capture further audio corresponding to speech representing the user's name. The device 110 may generate further audio data representing the further audio and may send the further audio data to the server(s) 120, which the server(s) 120 receives (1314).

The server(s) 120 (and more particularly the ASR component 350) may perform (1316) ASR processing on the further audio data to generate further text data representing the user name. The server(s) 120 may identify (1318) a user profile identifier (associated with the group profile identifier) having a user name corresponding to the further text data.

The server(s) 120 thereafter converts (1320) the anonymous voice profile feature vector into an explicit voice profile feature vector by associating the anonymous voice profile feature vector with the user profile identifier. Once the server(s) 120 associates the anonymous voice profile feature vector with the user profile identifier, the server(s) 120 may cause the anonymous voice profile feature vector to be deleted from the anonymous voice profile feature vector storage 385, and store the corresponding explicit voice profile feature vector in the explicit voice profile feature vector storage 365. The explicit voice profile feature vector may be associated with a particular explicit voice profile identifier in the explicit voice profile feature vector storage 365.

The server(s) 120 may associate the explicit voice profile feature vector's identifier with the user profile identifier, thereby associating the explicit voice profile with the user associated with the user profile identifier. The server(s) 120 may also associate the explicit voice profile feature vector's identifier with other identifiers of the user, such as a communications identifier used by the user to perform messaging and other two-way communications using the system. Thus, it will be appreciated that the foregoing associations may enable the system to significantly personalize a response to a user input when the system recognizes the user's voice using the explicit voice profile feature vector.

As described with respect to FIG. 13, a user may provide the system with a user input to convert an anonymous voice profile into an explicit voice profile after an anonymous voice profile for the user has already been generated. In some instances, a user may provide such input prior to an anonymous voice profile being generated for the user. In such a situation, the system may store data representing the user has already provided input (and their name) to convert an anonymous voice profile to an explicit voice profile. Thus, once the system has clustered enough user recognition feature vectors (representing user inputs spoken by the user) and has generated an anonymous voice profile therefrom, the system may convert that anonymous voice profile into an explicit voice profile based on the user previous instruction (without requiring the user provide further instruction).

Figure 14A:
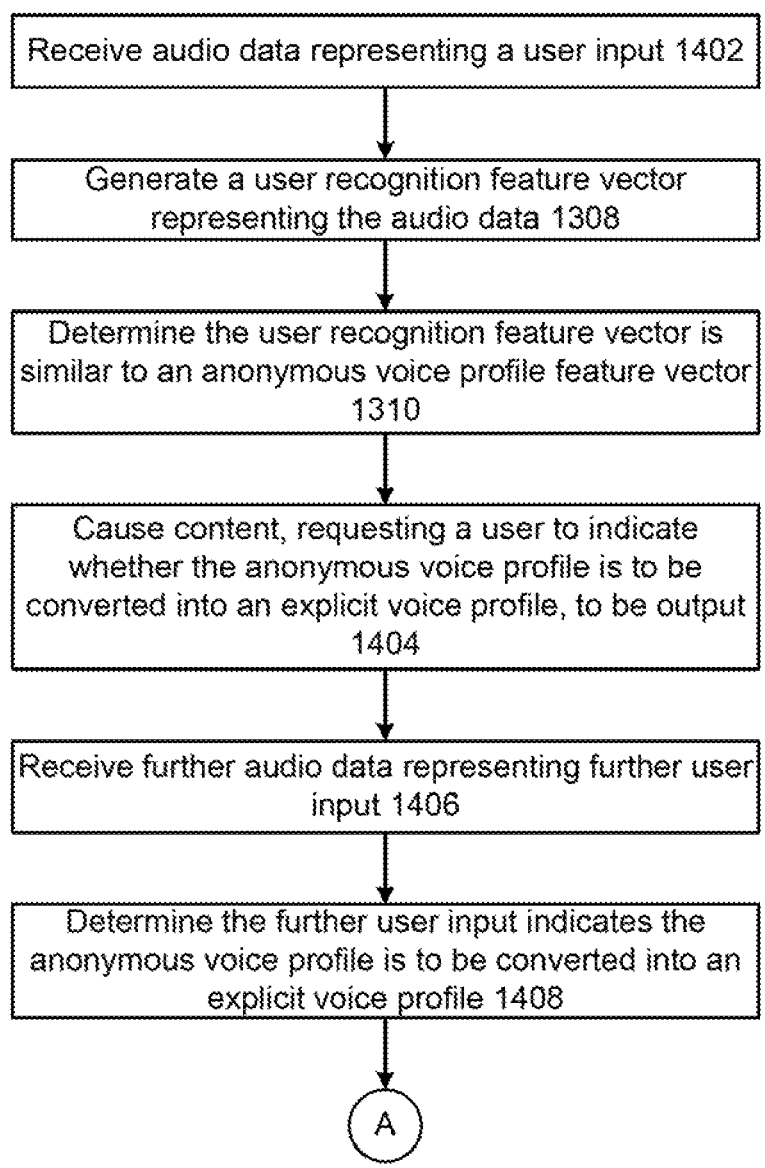
FIGS. 14A and 14B are a process flow diagram illustrating the conversion of an anonymous voice profile into an explicit voice profile according to embodiments of the present disclosure.
Figure 14B:
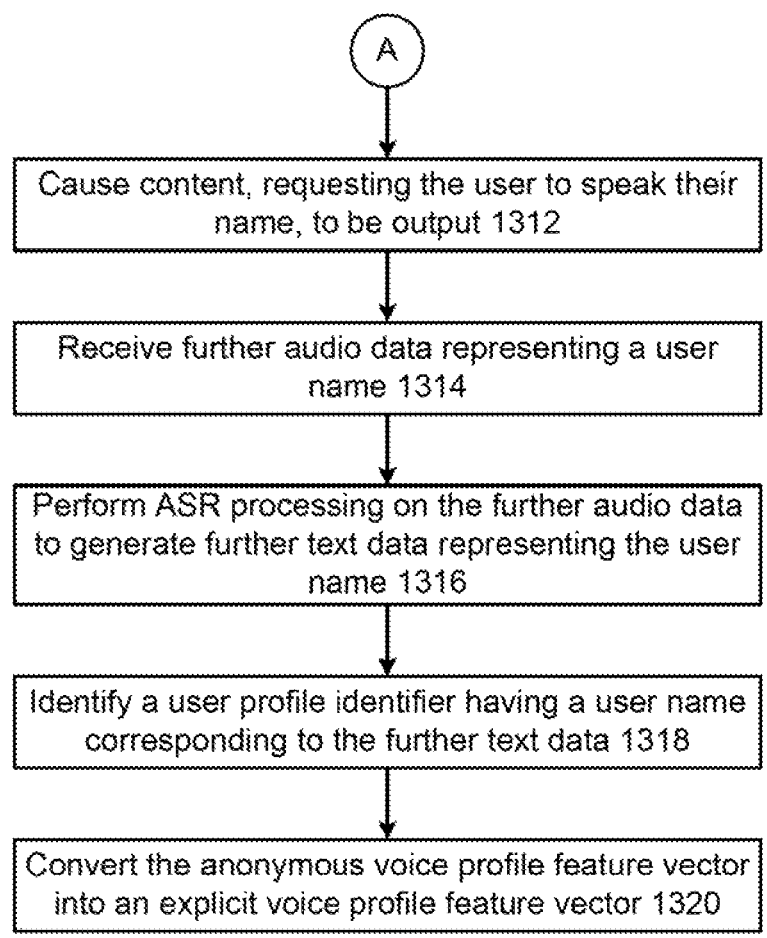

The system may alternatively proactively query a user as to whether an anonymous voice profile should be converted into an explicit voice profile (as illustrated in FIGS. 14A and 14B). A device 110 may receive audio representing a spoken user input. The device 110 may generate audio data representing the audio and may send the audio data to the server(s) 120, which the server(s) 120 receives (1402). The server(s) 120 may generate (1308) a user recognition feature vector representing the audio data and may determine (1310) the user recognition feature vector is similar to an anonymous voice profile feature vector.

The server(s) 120 may cause (1404) content (e.g., synthesized speech), requesting the user to indicate whether an anonymous voice profile (corresponding to the anonymous voice profile feature vector) is to be converted into an explicit voice profile, to be output. For example, such synthesized speech (or other outputtable content) may corresponding to "do you want me to learn your name," "would you like me to learn your name," of the like.

The device 110 may capture further audio corresponding to speech. The device 110 may generate further audio data representing the further audio and may send the further audio data to the server(s) 120, which the server(s) 120 receives (1406). The server(s) 120 may determine (1408) (using ASR processing and NLU processing) that the further user input indicates the anonymous voice profile is to be converted into an explicit voice profile.

After determining the further user input indicates the anonymous voice profile is to be converted into an explicit voice profile, the server(s) 120 may cause (1312) content (e.g., synthesized speech), requesting the user to speak their name, to be output. The device 110 may capture further audio corresponding to speech representing the user's name. The device 110 may generate further audio data representing the further audio and may send the further audio data to the server(s) 120, which the server(s) 120 receives (1314). The server(s) 120 (and more particularly the ASR component 350) may perform (1316) ASR processing on the further audio data to generate further text data representing the user name. The server(s) 120 may identify (1318) a user profile identifier having a user name corresponding to the further text data and convert (1320) the anonymous voice profile feature vector into an explicit voice profile feature vector by associating the anonymous voice profile feature vector with the user profile identifier.

As described above, a system may convert an anonymous voice profile into an explicit voice profile (e.g., by associating an anonymous voice profile feature vector with a particular user profile identifier) in response to voice user interface (VUI) interactions between a user and the system. Some systems may be configured to convert an anonymous voice profile into an explicit voice profile based on user input received via a companion application. For example, audio representing a user input (for which the system is unsure which particular user it belongs) may be output to a user via a companion application. The user may provide input (e.g., by text or selection of a virtual button) representing a user's name who spoke the speech in the output audio. Based on the tactile input, the system may convert an anonymous voice profile (generated using the output audio) into an explicit voice profile associated with a user profile identifier of the indicated user.

As described with respect to FIGS. 13 and 14A-14B, the server(s) 120 may identify a user profile identifier having a user name corresponding to a user input, and may convert an anonymous voice profile feature vector into an explicit voice profile feature vector by associating the anonymous voice profile feature vector with the user profile identifier. In some instances, the user name determined at step 1316 may not correspond to an already established user profile. In such instances, the server(s) 120 may generate a new user profile (and associated user profile identifier), associate the user profile identifier with the user name determined at step 1316, and convert the anonymous voice profile feature vector into an explicit voice profile feature vector by associating the anonymous voice profile feature vector with the newly created user profile identifier.

Figure 16:
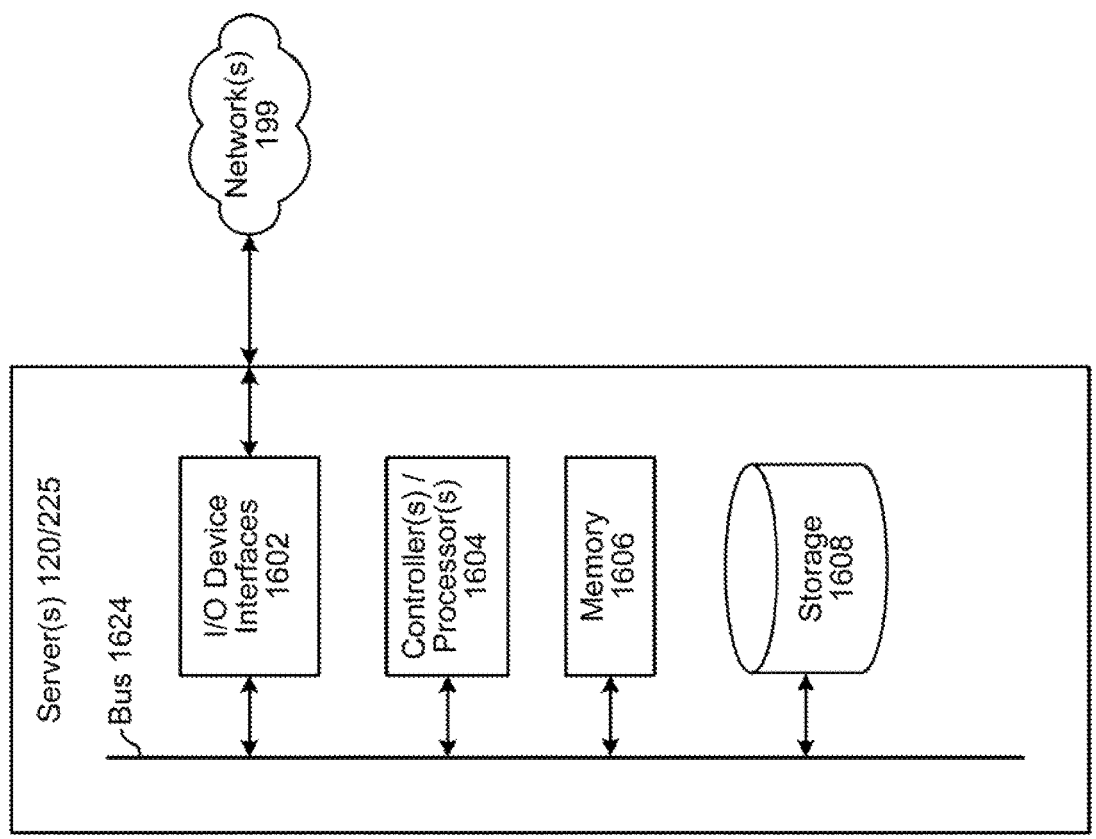
FIG. 16 is a block diagram conceptually illustrating example components of a server according to embodiments of the present disclosure.

FIG. 15 is a block diagram conceptually illustrating a device 110 that may be used with the system. FIG. 16 is a block diagram conceptually illustrating example components of a remote device, such as the server(s) 120, which may assist with ASR processing, NLU processing, etc., and the skill server(s) 325. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/325) may be included in the system, such as one or more servers 120 for performing ASR processing, one or more servers 120 for performing NLU processing, one or more skill server(s) 325 for performing actions responsive to user inputs, etc. In operation, each of these devices (or groups of devices) may include computer-readable and computer-executable instructions that reside on the respective device (120/325), as will be discussed further below.

Each of these devices (110/120/325) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/325) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (1502/1602).

Computer instructions for operating each device (110/120/325) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/325) includes input/output device interfaces (1502/1602). A variety of components may be connected through the input/output device interfaces (1502/1602), as will be discussed further below. Additionally, each device (110/120/325) may include an address/data bus (1524/1624) for conveying data among components of the respective device. Each component within a device (110/120/325) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the server(s) 120, or the skill server(s) 325 may include their own dedicated processors, memory, and/or storage. Alternatively, one or more of the components of the device(s) 110, the server(s) 120, or the skill server(s) 225 may utilize the I/O interfaces (1502/1602), processor(s) (1504/1604), memory (1506/1606), and/or storage (1508/1608) of the device(s) 110 server(s) 120, or the skill server(s) 325, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 325, as described herein, are illustrative, and may be located as a stand-alone device or may be included, in whole or in part, as a component of a larger device or system.

Figure 17:
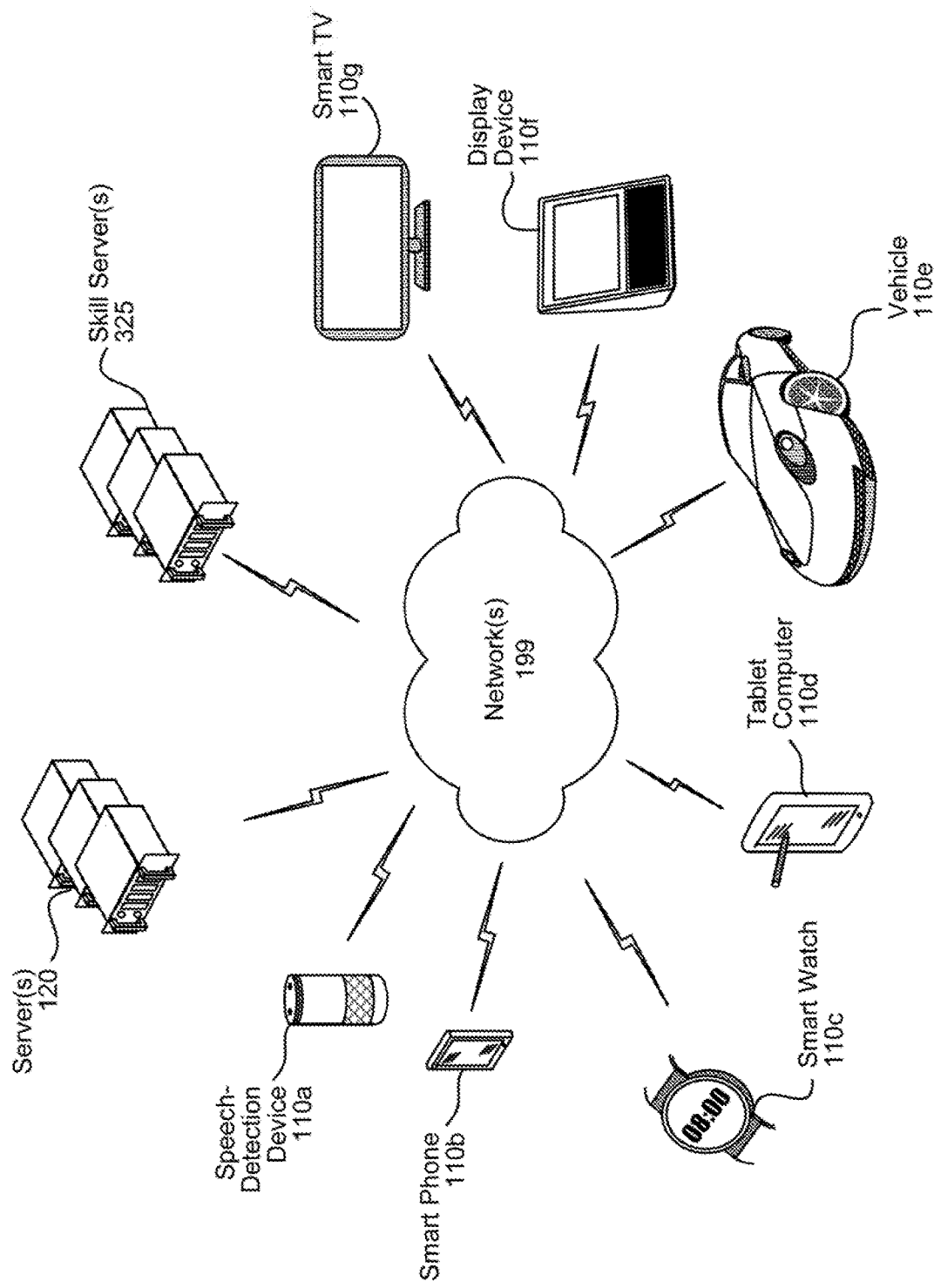
FIG. 17 illustrates an example of a computer network for use with the speech processing system.

As illustrated in FIG. 17, multiple devices (110a-110g, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, first audio data representing a first spoken user input;
generating a first feature vector representing first speech characteristics of the first spoken user input, the first feature vector being unassociated with specific user profile data;
determining a group profile identifier associated with the first device, the group profile identifier being associated with a plurality of user profile identifiers;
determining a first stored feature vector associated with the group profile identifier, the first stored feature vector representing second speech characteristics of a second spoken user input, the first stored feature vector being unassociated with specific user profile data;
determining a first similarity value between the first feature vector and the first stored feature vector;
determining the first audio data comprises a first number of speech frames;
determining the first number of speech frames satisfies a threshold number of speech frames;
generating, based at least in part on the first similarity value and the first number of speech frames satisfying the threshold number of speech frames, a first user recognition feature vector using the first feature vector and the first stored feature vector;
storing first data associating the first user recognition feature vector with the group profile identifier;
receiving, from the first device and after storing the first data, second audio data representing a third spoken user input;
generating a second feature vector representing third speech characteristics of the third spoken user input;
determining a second similarity value between the second feature vector and the first user recognition feature vector;
determining, based at least in part on the second similarity value, system usage data associated with the first user recognition feature vector, the system usage data representing at least first content output in response to at least one previous spoken user input corresponding to the first user recognition feature vector, the system usage data and the first user recognition feature vector being unassociated with specific user profile data;
determining, using the system usage data, an action responsive to the third spoken user input; and
performing the action responsive to the third spoken user input.

2. The method of claim 1, further comprising:
performing automatic speech recognition (ASR) processing on the first audio data to generate ASR output data;
performing natural language understanding (NLU) processing on the ASR output data to determine a first intent indicator;
storing second data associating the first feature vector with the first intent indicator;
determining the first stored feature vector is associated with at least a second intent indicator, the second intent indicator being different from the first intent indicator;
determining a number of intent indicators in a group of intent indicators including the first intent indicator and the second intent indicator;
determining the number of intent indicators is at least a threshold number of intent indicators; and
generating the first user recognition feature vector based at least in part on the number of intent indicators being at least the threshold number of intent indicators.

3. The method of claim 1, further comprising:
determining the first stored feature vector is associated with a second number of speech frames corresponding to the second spoken user input;
determining the second number of speech frames satisfies the threshold number of speech frames; and
generating the first user recognition feature vector further based at least in part on the first number of speech frames and the second number of speech frames both satisfying the threshold number of speech frames.

4. The method of claim 1, further comprising:
determining, after storing the first data, a second stored feature vector associated with the group profile identifier, the second stored feature vector representing a fourth spoken user input;
determining the second stored feature vector is associated with an intent indicator;
determining the intent indicator is represented in a list of intent indicators, each intent indicator in the list of intent indicators corresponding to at least one user input having less than a threshold amount of speech frames; and
generated, based at least in part on determining the intent indicator is represented in the list of intent indicators, the first user recognition feature vector without using the second stored feature vector.

5. A method, comprising:
receiving first audio data representing a first spoken user input;
generating first feature data representing first speech characteristics of the first spoken user input, the first feature data being unassociated with specific user profile data;

determining first stored feature data representing second speech characteristics of a second spoken user input, the first stored feature data being unassociated with specific user profile data;

determining a first similarity value between the first feature data and the first stored feature data;

determining the first audio data comprises a first number of speech frames;

determining the first number of speech frames satisfies a threshold number of speech frames;

generating, based at least in part on the first similarity value and the first number of speech frames satisfying the threshold number of speech frames, first user recognition feature data using the first feature data and the first stored feature data;

receiving, after generating the first user recognition feature data, second audio data representing a third spoken user input;

generating second feature data representing third speech characteristics of the third spoken user input;

determining the second feature data corresponds to the first user recognition feature data;

determining, after determining the second feature data corresponds to the first user recognition feature data, system usage data associated with the first user recognition feature data, the system usage data representing at least first content output in response to at least one previous spoken user input corresponding to the first user recognition feature data, the system usage data and the first user recognition feature data being unassociated with specific user profile data;

determining, using the system usage data, an action responsive to the third spoken user input; and performing the action responsive to the third spoken user input.

6. The method of claim 5, further comprising:

receiving, after generating the first user recognition feature data, third audio data representing a fourth spoken user input;

generating third feature data representing fourth speech characteristics of the fourth spoken user input;

determining a second similarity value between the third feature data and the first user recognition feature data;

presenting, based at least in part on the second similarity value, content requesting a name of a user that provided the fourth spoken user input;

receiving fourth audio data representing a first name;

determining a user profile identifier associated with the first name; and storing first data associating the first user recognition feature data with the user profile identifier.

7. The method of claim 5, further comprising:

receiving, after generating the first user recognition feature data, third audio data representing a fourth spoken user input;

processing the third audio data to determine the fourth spoken user input represents a command to associate the first user recognition feature data with a particular user profile identifier;

presenting content requesting a name of a user that provided the fourth spoken user input;

receiving fourth audio data representing a first name;

determining a first user profile identifier associated with the first name;

generating third feature data representing fourth speech characteristics of the fourth spoken user input;

determining a second similarity value between the third feature data and the first user recognition feature data; and storing, based at least in part on the second similarity value, first data associating the first user recognition feature data with the first user profile identifier.

8. The method of claim 5, further comprising:

determining a first intent indicator representing the first spoken user input;

determining the first stored feature data is associated with at least a second intent indicator, the second intent indicator being different from the first intent indicator;

determining a number of intent indicators in a group of intent indicators including the first intent indicator and the second intent indicator;

determining the number of intent indicators is at least a threshold number; and generating the first user recognition feature data further based at least in part on the number of intent indicators being at least the threshold number.

9. The method of claim 5, further comprising:

determining the first stored feature data is associated with a second number of speech frames;

determining the second number of speech frames satisfies the threshold number of speech frames; and generating the first user recognition feature data further based at least in part on the first number of speech frames and the second number of speech frames both satisfying the threshold number of speech frames.

10. The method of claim 5, further comprising:

determining, second stored feature data representing a fourth spoken user input;

determining the second stored feature data is associated with an intent indicator;

determining the intent indicator is represented in a list of intent indicators, each intent indicator in the list of intent indicators corresponding to at least one spoken user input having less than a threshold amount of speech frames; and generating, based at least in part on determining the intent indicator is represented in the list of intent indicators, the first user recognition feature data without using the second stored feature data.

11. The method of claim 5, further comprising:

receiving third audio data representing a fourth spoken user input;

processing the third audio data to determine the fourth spoken user input represents a command to associate user recognition feature data with a particular user profile identifier;

presenting content requesting a name of a user that provided the fourth spoken user input;

receiving fourth audio data representing a first name;

determining a first user profile identifier associated with the first name;

generating third feature data representing fourth speech characteristics of the fourth spoken user input;

storing, prior to receiving the first audio data, first data associating the third feature data with the first user profile identifier and an indicator representing the command; and storing, after generating the first user recognition feature data, second data associating the first user recognition feature data with the first user profile identifier.

12. The method of claim 5, further comprising:
receiving, after generating the first user recognition feature data, third audio data representing a fourth spoken user input;
generating third feature data representing fourth speech characteristics of the fourth spoken user input;
determining a second similarity value between the third feature data and the first user recognition feature data;
presenting, based at least in part on the second similarity value, content requesting a name of a user that provided the fourth spoken user input;
receiving fourth audio data representing a first name;
determining the first name is unrepresented in group profile data;
generating a new user profile identifier;
storing first data associating the new user profile identifier with the group profile data; and
storing second data associating the first user recognition feature data with the new user profile identifier.

13. A system, comprising:
at least one processor; and
at least one memory comprising instructions that, when executed by the at least one processor, cause the system to:
receive first audio data representing a first spoken user input;
generate first feature data representing first speech characteristics of the first spoken user input, the first feature data being unassociated with specific user profile data;
determine first stored feature data representing second speech characteristics of a second spoken user input, the first stored feature data being unassociated with specific user profile data;
determine a first similarity value between the first feature data and the first stored feature data;
determine the first audio data comprises a first number of speech frames;
determine the first number of speech frames satisfies a threshold number of speech frames;
generate, based at least in part on the first similarity value and the first number of speech frames satisfying the threshold number of speech frames, first user recognition feature data using the first feature data and the first stored feature data;
receive, after generating the first user recognition feature data, second audio data representing a third spoken user input;
generate second feature data representing third speech characteristics of the third spoken user input;
determine the second feature data corresponds to the first user recognition feature data;
determine, after determining the second feature data corresponds to the first user recognition feature data, system usage data associated with the first user recognition feature data, the system usage data representing at least first content output in response to at least one previous spoken user input corresponding to the first user recognition feature data, the system usage data and the first user recognition feature data being unassociated with specific user profile data;
determine, using the system usage data, an action responsive to the third spoken user input; and
perform the action responsive to the third spoken user input.

14. The system of claim 13, wherein the at least one memory further comprises instructions that, when executed by the at least one processor, further cause the system to:
receive, after generating the first user recognition feature data, third audio data representing a fourth spoken user input;
generate third feature data representing fourth speech characteristics of the fourth spoken user input;
determine a second similarity value between the third feature data and the first user recognition feature data;
present, based at least in part on the second similarity value, content requesting a name of a user that provided the fourth spoken user input;
receive fourth audio data representing a first name;
determine a user profile identifier associated with the first name; and
store first data associating the first user recognition feature data and the user profile identifier.

15. The system of claim 13, wherein the at least one memory further comprises instructions that, when executed by the at least one processor, further cause the system to:
receive, after generating the first user recognition feature data, third audio data representing a fourth spoken user input;
process the third audio data to determine the fourth spoken user input represents a command to associate the first user recognition feature data with a particular user profile identifier;
present content requesting a name of a user that provided the fourth spoken user input;
receive fourth audio data representing a first name;
determine a first user profile identifier associated with the first name;
generate third feature data representing fourth speech characteristics of the fourth spoken user input;
determine a second similarity value between the third feature data and the first user recognition feature data; and
store, based at least in part on the second similarity value, first data associating the first user recognition feature data with the first user profile identifier.

16. The system of claim 13, wherein the at least one memory further comprises instructions that, when executed by the at least one processor, further cause the system to:
determine a first intent indicator representing the first spoken user input;
determine the first stored feature data is associated with at least a second intent indicator, the second intent indicator being different from the first intent indicator;
determine a number of intent indicators in a group of intent indicators including the first intent indicator and the second intent indicator;
determine the number of intent indicators is at least a threshold number; and
generate the first user recognition feature data further based at least in part on the number of intent indicators being at least the threshold number.

17. The system of claim 13, wherein the at least one memory further comprises instructions that, when executed by the at least one processor, further cause the system to:
determine the first stored feature data is associated with a second number of speech frames;
determine the second number of speech frames satisfies the threshold number of speech frames; and
generate the first user recognition feature data further based at least in part on the first number of speech frames and the second number of speech frames both satisfying the threshold number of speech frames.

18. The system of claim 13, wherein the at least one memory further comprises instructions that, when executed by the at least one processor, further cause the system to:

determine second stored feature data representing a fourth spoken user input;

determine the second stored feature data is associated with an intent indicator;

determine the intent indicator is represented in a list of intent indicators, each intent indicator in the list of intent indicators corresponding to at least one spoken user input having less than a threshold amount of speech frames; and generate, based at least in part on determining the intent indicator is represented in the list of intent indicators, the first user recognition feature data without using the second stored feature data.

19. The system of claim 13, wherein the at least one memory further comprises instructions that, when executed by the at least one processor, further cause the system to:

determine a device identifier associated with first device that received the first spoken user input;

determine a group profile identifier associated with the device identifier, the group profile identifier being associated with a plurality of user profile identifiers; and determine the first stored feature data based at least in part on the first stored feature data being associated with the group profile identifier.

20. The method of claim 5, wherein performing the action comprises:

determining the system usage data represents a type of previously output data;

determining first output data responsive to the third spoken user input and corresponding to the type; and presenting the first output data.

* * * * *